United States Patent
Karim

(10) Patent No.: US 9,477,667 B2
(45) Date of Patent: Oct. 25, 2016

(54) CROWDSOURCED MULTI-MEDIA DATA RELATIONSHIPS

(75) Inventor: Omar Karim, Brooklyn, NY (US)

(73) Assignee: Mobdub, LLC, Brooklyn, NY (US)

(*) Notice: Subject to any disclaimer, the term of this patent is extended or adjusted under 35 U.S.C. 154(b) by 715 days.

(21) Appl. No.: 13/004,828

(22) Filed: Jan. 11, 2011

(65) Prior Publication Data

US 2011/0173214 A1 Jul. 14, 2011

Related U.S. Application Data

(60) Provisional application No. 61/295,146, filed on Jan. 14, 2010.

(51) Int. Cl.
*G06F 17/30* (2006.01)

(52) U.S. Cl.
CPC ..... *G06F 17/30044* (2013.01); *G06F 17/3002* (2013.01); *G06F 17/30029* (2013.01); *G06F 17/30041* (2013.01); *G06F 17/30056* (2013.01)

(58) Field of Classification Search
USPC ........ 707/724, 726, 737, 758, 754, 688, 803
See application file for complete search history.

(56) References Cited

U.S. PATENT DOCUMENTS

| | | | |
|---|---|---|---|
| 7,536,713 B1* | 5/2009 | Bartholomew | 726/7 |
| 2005/0060422 A1 | 3/2005 | Rudolph et al. | |
| 2005/0144305 A1* | 6/2005 | Fegan, II | H04L 65/602 709/231 |
| 2007/0260697 A1 | 11/2007 | Shapiro | |
| 2007/0300158 A1 | 12/2007 | Kasperkiewicz et al. | |
| 2008/0155230 A1 | 6/2008 | Robbins et al. | |
| 2009/0249185 A1* | 10/2009 | Datar et al. | 715/230 |
| 2010/0023506 A1* | 1/2010 | Sahni et al. | 707/5 |
| 2010/0169906 A1* | 7/2010 | Takahashi | 725/13 |
| 2011/0047163 A1* | 2/2011 | Chechik | G06F 17/30781 707/741 |

OTHER PUBLICATIONS

The PCT Search Report and Written Opinion mailed Aug. 30, 2011 for PCT application No. PCT/US11/20938, 9 pages.

* cited by examiner

*Primary Examiner* — Miranda Huang
(74) *Attorney, Agent, or Firm* — Han Santos Reich, PLLC

(57) ABSTRACT

The present disclosure describes a data association and retrieval facility. Attribute resources, such as metadata tags, that are not to be rendered along with a file, and content resources, such as annotations and commentary, which are to be rendered along with a file are associated with files, in particular multi-media files. The attribute and content resources may be searched and filtered against, and statistics on of file and resource accesses are tracked. Attribute and content resources may also be aggregated and redistributed. Altogether, these facilities constitute a platform to develop crowd-sourced applications and content packages. Finally, various user interfaces supporting particular applications are disclosed.

27 Claims, 18 Drawing Sheets

CROWDSOURCED MULTI-MEDIA DATA RELATIONSHIPS

RELATED APPLICATIONS

This patent application claims the benefit and priority to Provisional U.S. Patent Application No. 61/295,146, titled, "Crowdsourced Multi-media Data Relationships", filed on Jan. 14, 2010, to the same inventor herein, the entire disclosure of which is incorporated by reference herein.

TECHNICAL FIELD

The present disclosure relates to aggregating and correlating multi-media and improved operations on the same including, but not limited to acquisition, association, linking, annotation, commentary, rendering and search of multi-media.

BACKGROUND

A wide range of media is available for consumption on computers, including, but not limited to, video, audio, still images and text. Such media are generally stored as computer files. Some computer file formats support a mix of different media, and accordingly result in multi-media files. Accordingly a multi-media file is a file that supports one or more forms of media. Additionally, there are other computer file formats are specific to a particular application, including, but not limited to, office productivity applications such as document editors, spreadsheets and slide presentations.

Presently, the ubiquity of media capture devices, including, but not limited to, video cameras, digital still cameras, and recorders as well as the proliferation computers and multi-media editors, has resulted in an explosion of media and multi-media files. Furthermore, internet facilities, including, but not limited to, media sharing sites and email has facilitated wide distribution of media and multi-media files.

Typically, a user must open and render a file in order to ascertain the contents of the file. However, doing so renders searching or sorting large numbers of files cumbersome and time-intensive. Efforts to associate non-rendered text strings with the files, called meta-tags, have enabled using text search techniques on non-text multi-media files such as video or audio.

However, because meta-tags are not typically rendered along with a multi-media file, meta-tags do not add, supplement, or otherwise augment the content of the multi-media file. In cases, including, but not limited to, commentary and annotations, it may be desirable to associate data with a multi-media file, wherein the associated data is to be rendered along with the multi-media file.

Associated data need not be limited to text. Associated data may in fact be a multi-media file itself. An example is a mashup where two multi-media files, often from different contexts, are synchronized together for aesthetic effect.

Presently, there is no generalized system to associate arbitrary data with a multi-media file. Furthermore, there is no generalized system to synchronize associated arbitrary data, or to distribute the associated arbitrary data. Moreover, there is no generalized system to augment search and filter operations on multi-media files from the information that may be gleaned from the associated arbitrary data.

SUMMARY

The present disclosure describes associating arbitrary data with a multi-media file and improved retrieval of multi-media files by leveraging information that may be gleaned from the associated arbitrary data. Retrieval may come in many forms, including, but not limited to, searching, filtering and enumerating, by persons or by machines and for consumption either by a person or by a machine.

The present disclosure is directed to techniques, including, but not limited to, retrieval of particular multi-media files or retrieval of data associated with the multi-media files where the retrieval criteria are at least partially based on information that may be gleaned from the associated arbitrary data. The present disclosure is further directed to techniques on capturing statistics on operations relating to multi-media files associated with arbitrary data and on operations on arbitrary data associated with multi-media files, for auditing, optimization and other purposes, The techniques disclosed herein relating to retrieval of particular multi-media files at least partially based on information that may be gleaned from the associated arbitrary data, include, but are not limited to: (1) text based search on associated textual data such as annotations and commentary, (2) enabling hot spots on arbitrary objects in a video file to link to supplementary information, (3) enabling links to other files thereby enabling hyper-branch linking, (4) document search on documents with multi-media files, (5) filtering multi-media files available for consumption based at least on criteria relating to information that may be gleaned from the associated arbitrary data, (6) establishing channels or tracks where the content is based on filters based at least on criteria relating to information that may be gleaned from the associated arbitrary data, (7) continuous live programming, (8) polling, real-time or otherwise and (9) aggregating poll results and rendering in real-time.

The techniques disclosed in the present disclosure relating to retrieval of data associated with the multi-media files where the retrieval criteria are at least partially based on information that may be gleaned from the associated arbitrary data, include, but are not limited to: (1) filtering data associated with the multi-media files at least partially based on information that may be gleaned from the associated arbitrary data, (2) persisting the associated arbitrary data for distribution or consumption, (3) enabling monitors to exclude data associated or to be associated with multi-media files, (4) enabling editing of the associated data during rendering, (5) synchronizing commentary rendering, and (6) enabling selecting filtering and routing of data associated with multi-media files to various web services.

The techniques disclosed in the present disclosure relating to capturing statistics on operations relating to multi-media files associated with arbitrary data and on operations on arbitrary data associated with multi-media files, for auditing, optimization and other purposes, include, but are not limited to capturing and reporting statistics on: (1) particular files, (2) particular attributes of associated data and (3) operations on associated data. Additionally, techniques to aggregate, and report statistics are disclosed.

Various hardware and software architectures to enable the aforementioned are also disclosed.

BRIEF DESCRIPTION OF THE DRAWINGS

Non-limiting and non-exhaustive examples are described with reference to the following figures. In the figures, the left-most digit(s) of a reference number identifies the FIG. in which the reference number first appears. The use of the same reference numbers in different figures indicates similar or identical items or features.

DETAILED DESCRIPTION OF THE PREFERRED EMBODIMENTS

Overview: Relating Arbitrary Data and Media

Figure 1:
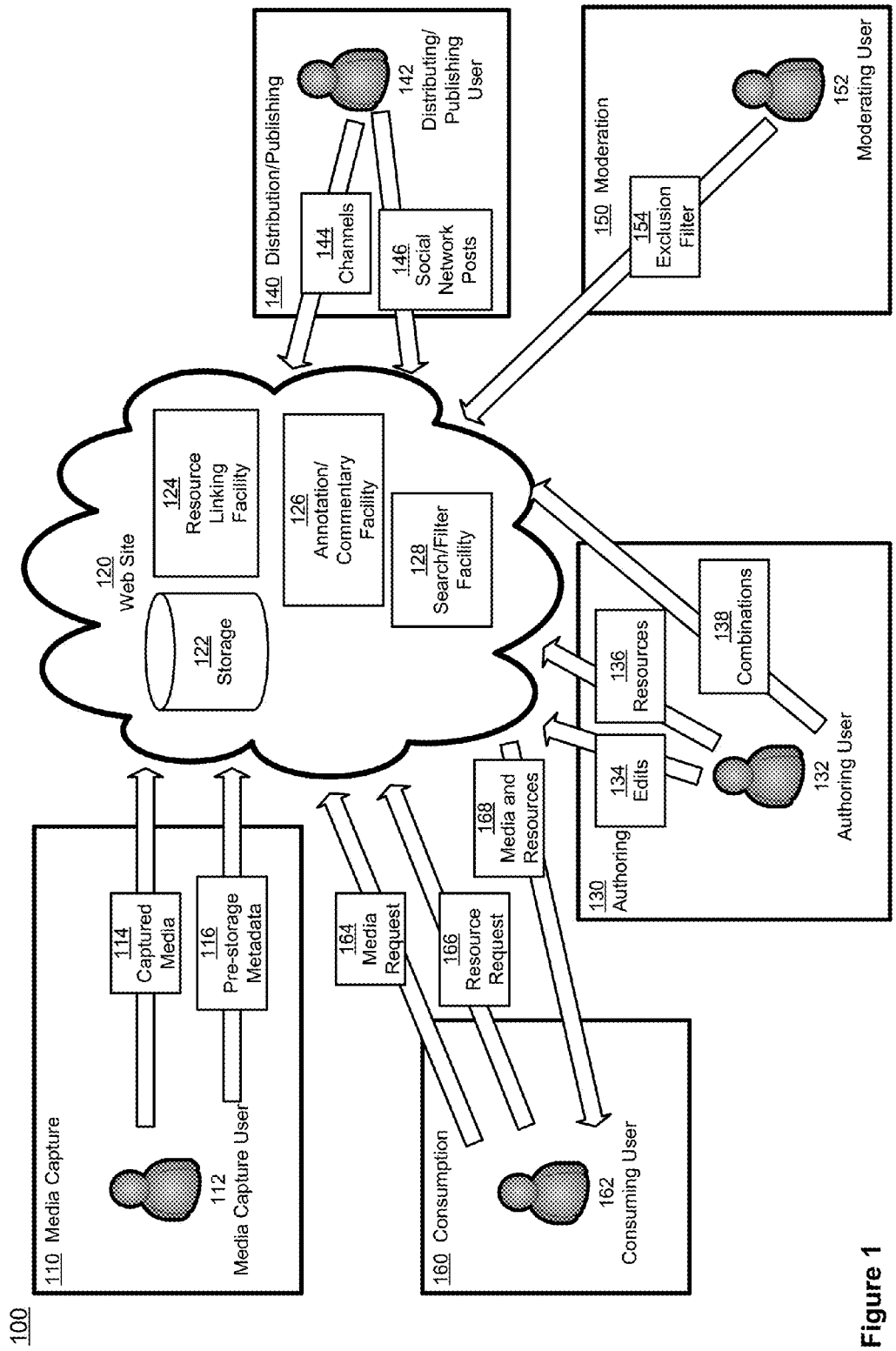
FIG. 1 is a data flow diagram illustrating various potential actors, data flows, software and hardware for an exemplary web service embodiment of the data association and retrieval facility.

The disclosed data association and retrieval facility provides for the end users to assembling a coherent media experience from disparate sources. Specifically, a file may be associated with arbitrary data. A special case is where a multi-media file is associated with other data that may be rendered alongside the multi-media file. For example, commentary and annotations associated with a multi-media file are displayed as the multi-media file is rendered. The commentary and annotations are likely from parties other than the author or the user who posted the multi-media file. From the perspective that posting the multi-media file is intended to elicit feedback from the public at large, the commentary, annotations or other associated data are said to be crowd-sourced.

Accordingly, the disclosed data association and retrieval facility provides a platform and techniques for end-users to create, upload and link one multi-media object or file to another for a specific point in time, position, geo-location or event. Thereupon, end-users may filter and recombine sets of attached objects into a custom experience, and the platform and techniques lend themselves to creating a social platform for crowd-sourcing annotations, commentary and analysis for a multi-media object or for an event.

The disclosed data association and retrieval facility supports capture of an ordinary event: a series of observables related in context, time, and space. However, because the platform and techniques support the linking of arbitrary resources, geolocation shifting and time-shifting are both supported. In fact, the media files of different contexts may be related together on an arbitrary basis. The files may be rendered together, for example in a mashup, or the files may be related by attribute, e.g. a hyper-branched portfolio of work by the same author. Similarly, the files and associated resources linked need not be restricted to conventional relationships; indeed the basis of the link is merely that some end-user thought the file and resource sufficiently related to link. Often, for less obvious links, end-users will author new context.

The ability to associate arbitrary data to a file by linking the data to the file allows the disclosed data association and retrieval facility to be related. Specifically, because a particular user or process was motivated to associate data with a file, the disclosed data association and retrieval facility may presume there is some relationship between the data and the file, and therefore there is utility in retrieving the file based on the associated data.

This relational model in fact has much utility, for example by filtering, retrieving or searching multi-media files based on the content of their linked resources; or by way of another example mining data embedded in linked resources for research or directed advertising purposes. Potentially, as a user's reliance on accuracy of linked resources increases, so does the likelihood that the quality of linked resources from crowd-sourcing correspondingly improves.

Exemplary Use Cases

FIG. 1 illustrates an exemplary use case 100 of the data association and retrieval facility. Use case 100 is comprised of: (1) use cases for media capture 110, including, but not limited to, storing the captured media to a web site 120, (2) authoring actions on the captured media, including, but not limited to, linking or associating data to the captured media, and editing the captured media and the associated data; (3) distributing and publishing the captured media and associated data; (4) moderating the sites where the captured media and associated data were distributed or published; and (5) consumption of the captured media and associated data by an end user or process.

Media capture 110 is the process of recording an event and persisting the event to a file. An event is a well-defined set of observables, or actions by particular a particular actor or set of actors. Typically, an event may be defined by the observables occurring at the same time and place, such as a football game at the local high school performed by the football game participants and audience. However, an event may also subsume other observables that are by actors not necessarily in the football game, for example a shooting star passing overhead the football game by coincidence. Furthermore, the observables in an event need not be in the same time or place. For example, an author may create a multi-media file interleaving three New Years countdown parties by family members in New York City, London, and Hong Kong. Not only are the observables geo-location shifted, because the observables are in different time zones, the observables are also time shifted. Specifically, a multi-media file interleaving the three parties are conceptually related simply being New Years Parties by members of the same family, regardless of the time or location of the observables. Accordingly, because a multi-media file may include content from different parties, times and locations, a multi-media file may indeed interleave content from different contexts solely for aesthetic effect, such as with a mashup. In fact, the observable may be a virtual observable, for example a computer generated animation of a virtual character.

Media capture 110 is performed by a media capture user 112. Typically, a media capture user is an end user with a digital video camera, digital still camera, or audio recorder. In this case, the captured media 114 is video, still and audio respectively. However, a media capture user need not be a human being, and could be a process such as a computer operated camera. Furthermore, because the captured media 114 may be computer generated animation, the media capture user 112 may be a computer graphics artist.

The media capture user 112, upon capturing media 114 may upload the captured media 114 to web site 120. Optionally, the media capture user 112 may upload pre-storage metadata 116 associated with the captured media 114. Pre-storage metadata 116 is any metadata or data associated with the captured media 114 prior to storage in web site 120. Pre-storage metadata 116 may come in the form of attributes, which are not necessarily rendered along with a file. Attributes include, but are not limited to, an identifier of the person or process capturing the media such as a name, or identifying number. Attributes may also include, but is not limited to, the date-time stamp, the location of where the media was captured, the filename, or some other metadata tag associated with the captured media 114. Pre-storage metadata 116 may also come in the form of linked or associated data that is to be rendered along with the file, including, but not limited to annotation or commentary added prior to storage.

Web site 120 comprises a network site where captured media 114, usually in the form of a persisted multi-media file may be uploaded such that other users may access the file for operations including, but not limited to, authoring, data association, distribution and publishing, filtering, and consumption. Accordingly, web site 120 comprises: (1) a storage 122 for storing the captured media 114 or references to the captured media 114, (2) a resource linking facility 124 to link or associate arbitrary data with the stored captured media 114, (3) an annotation/commentary facility 126, which is a special case of resource linking facility 124 optimized for associating annotations and commentary, and (4) a search/filter facility by which captured media 114 stored in storage 122 may be retrieved on criteria on the captured media 114 or on resources linked to captured media 114.

The web site may in the form of a traditional web site where a multi-media file is simply stored in a database front ended by dynamic hyper text markup language (D/HTML). Alternatively, the web site may be a web service. Note that the captured media 114 need not be uploaded to a web site 120, and that web site 120 might be replaced by a server application front-ending a data store, where both are located on a server on a local area network (LAN).

Storage 122 stores either the captured media 114 or references to the captured media 114. The former has the advantage of having all data centralized, and the latter has the advantage or requiring less storage. Storage 122 may also store pre-storage metadata 116, associated data, and references to associated data, and link information. For example, storage 122 may store a reference to multi-media file myfile.mp4, but not to the file itself, but may also store pre-storage metadata 116 attributes such as the date-time stamp of when the file was captured, along with commentary data associated with the file after storage. Additionally, storage 122 might store links to related web sites, but opt not to redundantly store any of the web site content. Since retrieval operations are likely to have criteria based on pre-storage metadata along with linked and associated data, performance may also be enhanced by having storage 122 only store data likely to be scanned and references to other data such as the file itself and the linked or associated data.

Storage 122 may be implemented in a variety of ways, for example as a relational database management system (RDBMS). Alternatively, storage 122 may be implemented either as an object oriented database management system (OODBMS) or object-relational database management system (ORDBMS). In some scenarios, such as in cloud computing, storage 122 may be implemented as a key-value database, such as Cassandra. Furthermore, storage 122 may be implemented as multiple heterogeneous and distributed databases.

Resource linking facility 124 enables a resource to be linked or associated to a file. A resource may be an attribute or content. Attributes are generally not rendered with a file whereas content may be rendered along with a file, that is may be displayed when the file is being rendered. An example of an attribute resource is a metadata tag, such as a date-time stamp or a geo-tag. An example of a content resource is an annotation. Note that another file may also be a content resource, such as a text or audio. If the content is a web page, a web page may be associated with a file by storing its uniform resource locator (URL) as a reference. Such an association is a link. Furthermore, because a multi-media file may be a content resource, it is possible for the multi-media file to itself store URL links, i.e. hyper-links back to the original file thus enabling hyper-branched files, or files that store link references to each other. Content resources may be office productivity documents, or even executables such as Adobe Flash™ or Microsoft Silverlight™ scripts.

If storage 122 is a relational database, resource linking facility 124 might operate as a set of structured query language (SQL) stored procedures or queries which store a record associating a resource reference, or some portion of the resource itself with a file in a relational table in an RDBMS. Alternatively, if storage 122 is a key-value database, the relation may simply be stored as a value pair.

Annotation/commentary facility 126 is a special case of resource linking. Annotation is data associated with a particular time and location in a file. Accordingly, when the file is rendered, the annotation content appears after a predetermined amount of time has passed while playing the file and appears associated with a particular location on the screen. For example, after 5 seconds have passed in a video file, at pixel location 100, 110, a person appears, and annotation text of the person's name might appear at 110, 120 with an arrow to 100, 110. Commentary is data associated with a file, but not specifically with a time or location in a file. For example, commentary may be in a scrolling edit box underneath a file being rendered, and appears at all times. A version of commentary call synchronized commentary may have commentary appear at predefined times. For example, after 10 seconds of playing a video file, "Comment X" may appear in the scrolling edit box. After 15 second, perhaps "Comment Y" may appear afterwards in the scrolling edit box.

The annotation/commentary facility 126 may operate similarly to resource linking facility 124 where links to the data comprising the annotation or commentary are stored separately, and references to the data are stored in storage 122. However, to facilitate full text search of the annotation or commentary, annotation/commentary facility 126 may opt to store the data directly in storage 122. Note that annotation/commentary content is not necessarily just text. Media objects or files may be embedded along with URLs to web sites or other resources addressable by a URL such as a file. As with the resource linking facility 124, the annotation/commentary facility 126 may be implemented as SQL stored procedures or queries where storage 122 is a RDBMS.

Search/filter facility 128 enables retrieval of files, associated or linked data, or references to either files or data. Retrieval subsumes filtering both filtering as well as searching according to criteria. Retrieval may be either by human users or processes. Accordingly, search/filter facility 128 might expose an application programming interface allowing a process to invoke search/filter facility 128. Results may be returned either as an enumeration of files or references to files, or alternatively an enumeration of content of data associated or linked to files. In the latter case, the results might be rendered not merely as a list, but further filtered and organized into a composite view, as in a web site.

Authoring use case 130 is where an authoring user 132 modifies the files and associated data for any purpose. Specifically, the authoring use case describes an authoring user 132 to edit files 134, edit attributes or content 136, or to combine files and content together into an amalgam 138.

Authoring user 132 may be either a person or a process and need not be the same as any of the other users depicted in FIG. 1.

File edits 134 may be submitted to web site 120. Specifically, authoring user may have video, still image, or audio editing software and may modify the referred to or stored in storage 122. Editors will widely vary depending on the file.

Resource edits 136 may also be submitted to web site 120. Resource edits may come in the form of either associating or linking new data with a file or editing data already associated or linked to a file. Resource edits may come in the form of an editor, such as a text editor. Alternatively, resource edits may come in the form of a web site, for example a web site that enable annotation or commentary edits. For the case where the resource to be edited is an attribute, property editors may be used.

Files combinations 138 may also be submitted to web site 120. While file edits 134 edit the single underlying file, and while resource edits 136 merely edit the associated data, a file combination enables multiple files and resources to be combined or amalgamated into a single file. In this way, two files may be amalgamated into a single file, as in a mashup. Alternatively, a single distribution file combining the underlying file and its associated attributes and content might be made. In some scenarios, it may be desirable to distribute the associated and linked data separately from the underlying file, and in that case only the associated and linked data are amalgamated into a single file.

Distribution/publishing use case 140 allows a distributing/publishing user 142 to post files and their associated or linked data for consumption. Distributing is the actual distribution of files and data to users. Publishing is the enabling of a user to consume files and data without actually having possession of the underlying file or data. For example, if an MP3 audio file is physically transferred between two cell phones, the sending cell phone is distributing the MP3 to the receiving cell phone. However, if a web page allows a user to play an MP3 file, but does not allow download, the MP3 file is published.

Distributing/publishing user 142 may be either a person or a process and need not be the same as any of the other users depicted in FIG. 1.

One possible way for files and associated or linked data to be distributed/published is to create a channel 144. A channel is a filter comprised of several criteria. In the case where storage 122 and search/filter facility 128 are implemented as an RDBMS, the channel criteria may be a filter embodied in a SQL query, and stored either as a query or as a stored procedure. Alternatively, a channel engine may simply store the criteria as text, and dynamically general SQL as needed. The query is periodically executed, and files and associated or linked data satisfying the criteria are queued into a buffer for consumption. As the queue empties, the channel query is re-executed. In the case where no more files or associated data are retrieved, previously retrieved content may be re-queued, or a message stating that the channel is exhausted may be presented to the user.

Another possible way for files and associated or linked data to be distributed/published is via posting to a social network 146. As user might participate in multiple social networking web sites, for example Facebook™, Twitter™, and LinkedIn™. Because different social networks serve different purposes, it may be desirable for a user to post different files and associated or linked data to different social networks based on particular criteria or event. A distributing/publishing user 142 may specify the criteria by which when that user 142 posts a file or associates or links data, that post or association/link is simultaneously posted to a particular social network. In this way, a user is saved the effort of reposting the same post to different social networks.

Channels 144 and social network posts 146 are merely two exemplary techniques to distribute or publish comment. The above discussion of channels 144 and social network posts 146 is not intended to limit the techniques of distributing or publishing herein.

The moderation use case 150 is the use case of a moderating user 152, such as an administrator, filtering files and associated or linked data stored or referenced in web site 120. Common filters include, but are not limited to, profanity filters, pornography filters, and bans on particular users.

Moderating user 152 may be either a person or a process and need not be the same as any of the other users depicted in FIG. 1.

Moderating user 152 may implement exclusion filters 154 by specifying criteria on which files or associated or linked data is not to be provided by web site 120. Specifically, where storage 122 and search/filter facility 128 are implemented as an RDBMS, an exclusion filter 154 may be implemented as a SQL view from which all external queries are executed against. In this way, only the data exposed by the SQL view is ever served out of web site 120. For example, if user "X" is banned from web site 120 via exclusion filter 154 where a SQL view "Master" only retrieves files and associated or linked data where user "X" was not the contributor. Subsequent filters such as channels are then executed against SQL view "Master", and accordingly will never execute queries against contributions of user "X".

Alternatively, if a SQL view is not desirable, moderating user 152 may simply permanently delete all contributions by user "X". However, this will not filter out future contributions by user "X".

Consumption use case 160 allows consuming user 162 to retrieve files and associated or linked data from web site 120 for rendering or other uses. Typically, consuming user 162 sends a request for a file 164, such as a multi-media file, or a request for a resource 166, and receives the corresponding media and resources 168 for consumption.

Consuming user 162 may be either a person or a process and need not be the same as any of the other users depicted in FIG. 1.

Requests 164 and 166 come in the form of retrieval criteria. The retrieval criteria may be conditions on the file itself, on attributes on the file, or on the content of the associated or linked data to the file. The requests 164 and 166 are submitted to the search/filter facility 128. Where storage 122 and search/filter facility 128 are implemented as an RDBMS, the retrieval criteria may be in the form of a SQL query, or of text that may be dynamically converted into a SQL query. The query is then executed and the records corresponding to the media and resources satisfying the criteria are returned to the consuming user 162.

Figure 2:
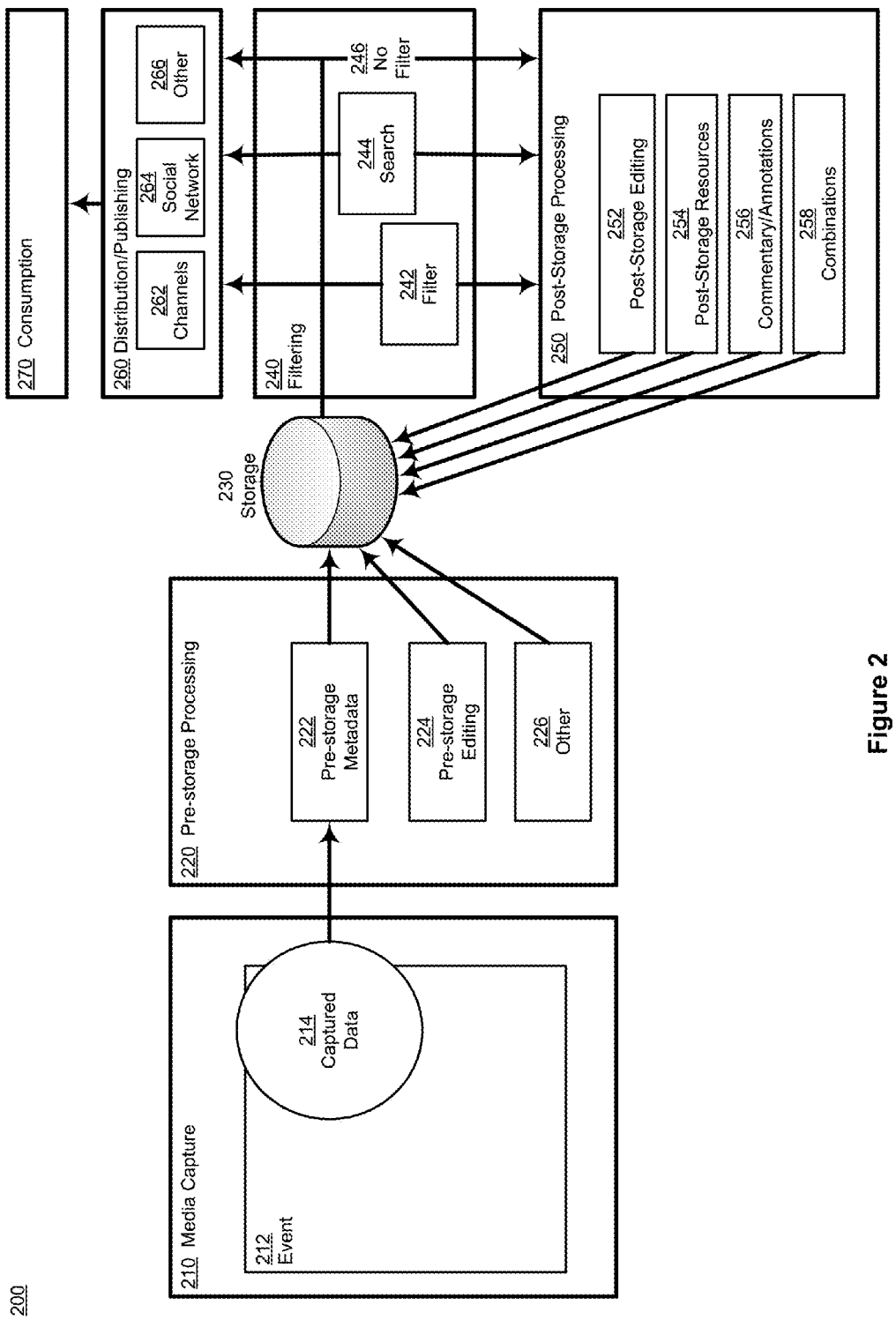
FIG. 2 is a block diagram illustrating an exemplary processing embodiment of the data association and retrieval facility.
Figure 3:
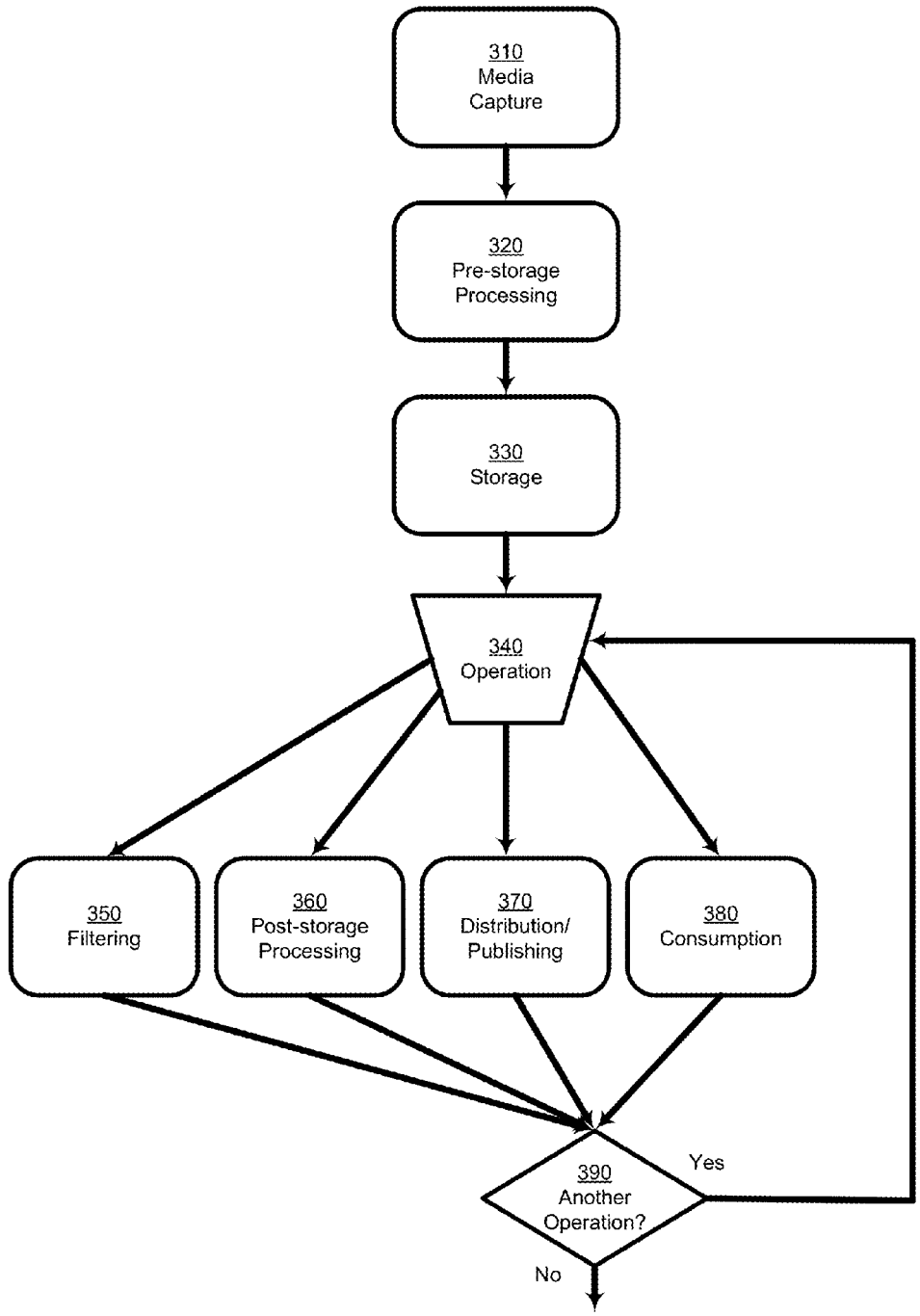
FIG. 3 is a flow chart illustrating an exemplary processing embodiment of the data association and retrieval facility.

The returned data 168 may be in the form of an enumeration. However, the data may be further modified Exemplary Multi-Media File Lifecycle FIG. 1 illustrates the disclosed data association and retrieval facility as a number of asynchronous operations performed in no particular order. From the perspective of performing operations any multiple files and resources, this is certainly the case. However, from the perspective of a single file, operations are more serialized. Accordingly, FIGS. 2 and 3 illustrate an exemplary the lifecycle of a single multi-media file, and its associated or linked resources. Specifically, FIG. 2 is a block diagram and FIG. 3 is the corresponding flowchart.

FIGS. 2 and 3 illustrate an exemplary flow 200 and 300 of a file as it progresses through the disclosed data association and retrieval facility. Specifically, it progresses through: (1) media capture 210 and 310, (2) pre-storage processing 220 and 320 and (3) storage 230 and 330. After storage, a user may choose from multiple operations 340, including but not limited to: (1) filtering 240 and 350, (2) post-storage processing 250 and 360, (3) distribution/publishing 260 and 370 and (4) consumption 270 and 380. These operations may be done in any order and in any number per a user's choice 390.

During media capture 210 and 310, some portion of event 212 is captured. As stated above, an event is a set of observables that may be related. A media capture event may be performed by any recording device, or in the case of a virtual event, by a computer graphics editor. The resulting captured data is 214 is persisted to a file. The captured data 214 may include all or only a portion of the event 212. The captured data 214 may include some non-event data as well. For example, when video-taping an airplane show, one may also capture an extraneous bird flying by which would not be formally part of the show.

The file may undergo processing 220 and 320 prior to upload to a web site 120. Prior to the file being persisted, metadata attributes such as a date-time stamp may be captured 222. After the file is persisted, the file may be edited 224. Specifically, a still photo may be cropped, or its colors edited via a photo editor such as Adobe Photoshop™. File editing 224 also includes editing attributes such as metadata tags and the file name. It is also possible that the file undergoes other editing such combinations with other files or with associated or linked resources. For example, individuals captured in one photo may be separated from the original photo and superimposed onto another, such as making a local individual appear to be located in a faraway city. The original captured file might be downloaded along with annotations and commentary from a web site. The additional of annotations and commentary, or any other resources that might be rendered along with the original file might comprise other editing 226.

Accordingly, media capture 210 and 310 and pre-storage processing 220 and 320 together provide the basis of implementing the media capture use case 110 in FIG. 1.

By definition, pre-storage processing 220 and 320 ends upon being stored 230 and 330. Strictly speaking, the file need not be stored in storage 122. For example, a file may reside in a separate web site, or on a user's public directory. While, storage 230 and 330 does not preclude actual storage of the file in storage 122, it may more commonly mean any combination of: (1) storage of a reference to the file, (2) storage of file attributes and pre-storage associated and linked data, or (3) storage of references to attributes and pre-storage associated and linked data. Accordingly, storage 220 and 320 provides a baseline from which further operation may be performed on the file and associated or linked data.

In FIG. 3, a choice of operations on a file can be performed in 340. Operations include, but are not limited to: (1) filtering 240 and 350, (2) post-storage processing 250 and 360, (3) distribution/publishing 260 and 370, and (4) consumption. To illustrate that multiple operations may be performed sequentially, step 390 provides an option to perform another operation. If no other operation is chosen, then further processing may continue.

Turning back to FIG. 2, once a file or its reference has been committed to storage 230 and 330, it must be retrieved via a filter 240 and 350 prior to another operation. Filtering operations 240 and 350 are operations to retrieve files and their associated or linked resources based on specified criteria. A filter 242 any set of criteria to limit returned files or associated or linked data according to those criteria. A search 244 is a special filter where a user progressively searches for a specific instance or relatively small set of instances of a file and associated or linked data. Item 246 illustrates the option where no filtering operation is performed.

If the underlying storage 122 of storage operation 230 and 330 is an RDBMS, filters 242 may be made into transferable objects. Specifically, a text file may store values that may be dynamically generated into SQL queries or stored procedures. Alternatively, criteria may be added to the WHERE clause of a SQL view. For commonly used criteria, the criteria may be transformed into a SQL query or a SQL stored procedure. SQL views, queries, and stored procedures are generally exportable by an RDBMS and may be recreated either from binary form or via a SQL script stored in text. These operations are generally performed in the search/filter facility 128.

Similarly, if the underlying storage 122 of storage operation 230 and 330 is an RDBMS, search operations 244 may be in the form of entering keywords into a buffer, where search/filter facility 128 convert the keywords into a SQL query. Specifically, the search/filter facility 128 adds additional WHERE clauses to a root SQL query based on the keyword.

In both the cases of filtering 242 and searching 244, the search/filter facility retrieves records corresponding to the SQL statements either entered or generated by the search/filter facility 128.

It is to be noted that the search/filter facility 128 requires additional functionality beyond a traditional RDBMS. Specifically, the search/filter facility searches through attributes and associated or linked content. Since attributes and resources are not necessarily stored in the storage 122, search/filter facility 128 may require three steps of operations. The first operation is a SQL operation to retrieve all data matching criteria on fields actually in the database. The second operation is to expand out references in associated or linked data. For example, where storage 122 only contains a reference to associated data, the data is retrieved, converted to a common text format, such as ASCII, and placed into a buffer associated with the file. By way of further example, where a resource, such as a web site or file is linked via an embedded URL, again the resource is traced, expanded, and converted to a common text format. Optionally, some or all of the expansion may be indexed in an index server. The third operation is then to perform full text search on the data expanded in the buffer.

In the case of web sites or other content resources that also potentially contain linked resources, search/filter facility 128 may limit recursion based on the amount of buffer memory available. The expanded resources are generally expanded dynamically on request, but in some performance scenarios, may be pre-expanded, parsed, and flags or fields populated in the storage 122.

Accordingly, the filters 242 and search 244 techniques in filtering operation 240 and 350 provide the low level operations necessary to support exclusion filters 154 in the moderation use case 150 in FIG. 1, and the channels 144 and social network posts 146 in the distribution/publishing use case in FIG. 1.

Upon retrieval, via filtering operation 240 and 350, a file may be further edited during post-storage processing 250 and 360 or may be distributed/published 260 and 370.

Post-storage processing 250 and 360 allow for the editing of files and associated or linked data. The files themselves may be edited 252 in operations as discussed with respect to item 134 in FIG. 1. The associated or linked data may be edited 254 as discussed with respect to item 136 in FIG. 1.

Note that resource editing 254 includes the association or disassociation of content with a file, the content being rendered along with the file. Commentary and annotation editing 256 are an example of editing content to be associated with a file. By entering content into an annotation editor, the text may be associated with a particular time and location in the file. This operation stores the at least the text, time offset, location in a data store, not necessarily the same as storage 122. Other annotation attributes stored may include, but are not limited to the identity of the author and date-time stamp of entry. When the annotation is performed in the editor, a notification, potentially implemented as a SQL trigger, to store a reference to the annotation data in storage 122. Alternatively, a copy of the annotation data may be stored in storage 122 as well. Similar operations may be performed with commentary except that the time offset and location data are not stored, and with synchronized commentary, except that the location data is not stored.

The underlying file and the associated or linked resources may be combined 258 as discussed with respect to item 138 in FIG. 1. Because it may be desirable to preserve the underlying files, where two files are combined, or where resources are combined, or where files and resources are combined, the disclosed data association and retrieval facility may create separate copies and store corresponding references in storage 122. In this way, the original underlying files may be used again. For example, if a file F1 is combined with another file F2 into mashup M, M may be stored as a separate file from F1 and F2, thus allowing other users to create additional mashups from files F1 and F2, and for users to associate or link additional data to files F1 and F2. As for mashup M, users may further edit the file, and separately associate or link additional data.

Accordingly post-storage processing operation 250 and 360 provide the low level operations necessary to support authoring use case 130 in FIG. 1.

Distribution/publishing operation 260 and 370 allow for files and their associated or linked data to be made available either by allowing the underlying file and associated or linked data to be copied (distribution) or to be rendered without copy (publishing). There are many distribution and publishing scenarios; channels 262 and social network posts 264 are offered as examples. Channels 262 correspond to operations as discussed with respect to item 144 in FIG. 1, and social network posts 264 correspond to operations as discussed with respect to item 146 in FIG. 1.

Both channels 262 and social networks posts 264 are built upon filters 242. Specifically, criteria are specified as to files and associated or linked data to be distributed/published. However, filters 242 only provide an enumeration of files and associated or linked data that match the criteria in the filter 242. Facilities implementing channels 262 and social networks posts 264 include logic in the form of scripts, executables and notifications to perform the distribution/publishing of the files and associated or linked data enumerated by filter 242.

For example, a channel 262 might be implemented as a web page. A user will access the web page, and open a channel. The web page will run a server side script that accesses a queue. If the queue contains files and associated or linked data, it will render the first available item on the web site. If the queue is empty, it will invoke the appropriate filter, and will populate the queue accordingly. If there are no matching records, a notification is sent by the search/filter facility 128 to the server script, which in turn may display an error message or perform other error handling.

By way of another example, a social network post might also be implemented as a web page. A user will access the web page. The web page will contain a search facility and a commentary editor. The user will execute a search 244 and will retrieve a number of matching files. The user will select a file to render and will proceed to enter commentary into the editor. Upon committing the commentary, a record containing a reference to the commentary, or perhaps the commentary itself is posted to the storage 122. Upon posting, if certain prespecified criteria corresponding to a social network are satisfied, a SQL trigger is executed. The SQL trigger will then extract the posted commentary or commentary reference, expand as necessary, and then will post the commentary to the corresponding social network. One way to implement this would be via a MS-SQL™ stored procedure on a Microsoft SQL Server database. MS-SQL™ stored procedures are capable of calling common object model (COM) methods, which in turn might invoke API calls in the social network. One example is that upon receiving a notification from a trigger, the MS-SQL™ stored procedure uses SQL to extract out the recently posted comment, and calls a pre-coded COM object that stores text to a Twitter™ account. Other analogues exist with the Oracle™ RDBMS using Java™ language invocations. Alternatively, an embodiment may comprise and executable or client side script that directly invokes an API accessible in the social network site, web service provider, or similar analogue.

Channels 262 and social network posts 264 are only two examples of distribution and publication. There are a number of other operations 266 supported. Yet another operation is a standard search facility. Specifically, a user enters keywords, the keywords are converted to SQL via search 244, and a number of files and associated or linked data that match criteria generated from the keywords is retrieved, and displayed via a server script in a web page.

Accordingly, SQL operations, notifications, scripts, and executables of the distribution/publishing operation 260 and 370 may provide the infrastructure to support the distribution/publishing use cases described in FIG. 1.

Consumption operation 270 and 380 is where the end user or consuming process receive the copy of the final file and associated or linked data, or a rendering thereof. The consumption operation is typically within the context of an application, web or otherwise. Various consumption operations will be discussed with respect to FIGS. 8, 9, 10, 11 and 12 below.

Accordingly, consumption operation 270 and 380 provides the infrastructure to support the consumption use case, as described with respect to item 160 in FIG. 1.

Exemplary Hardware Environment

Figure 4:
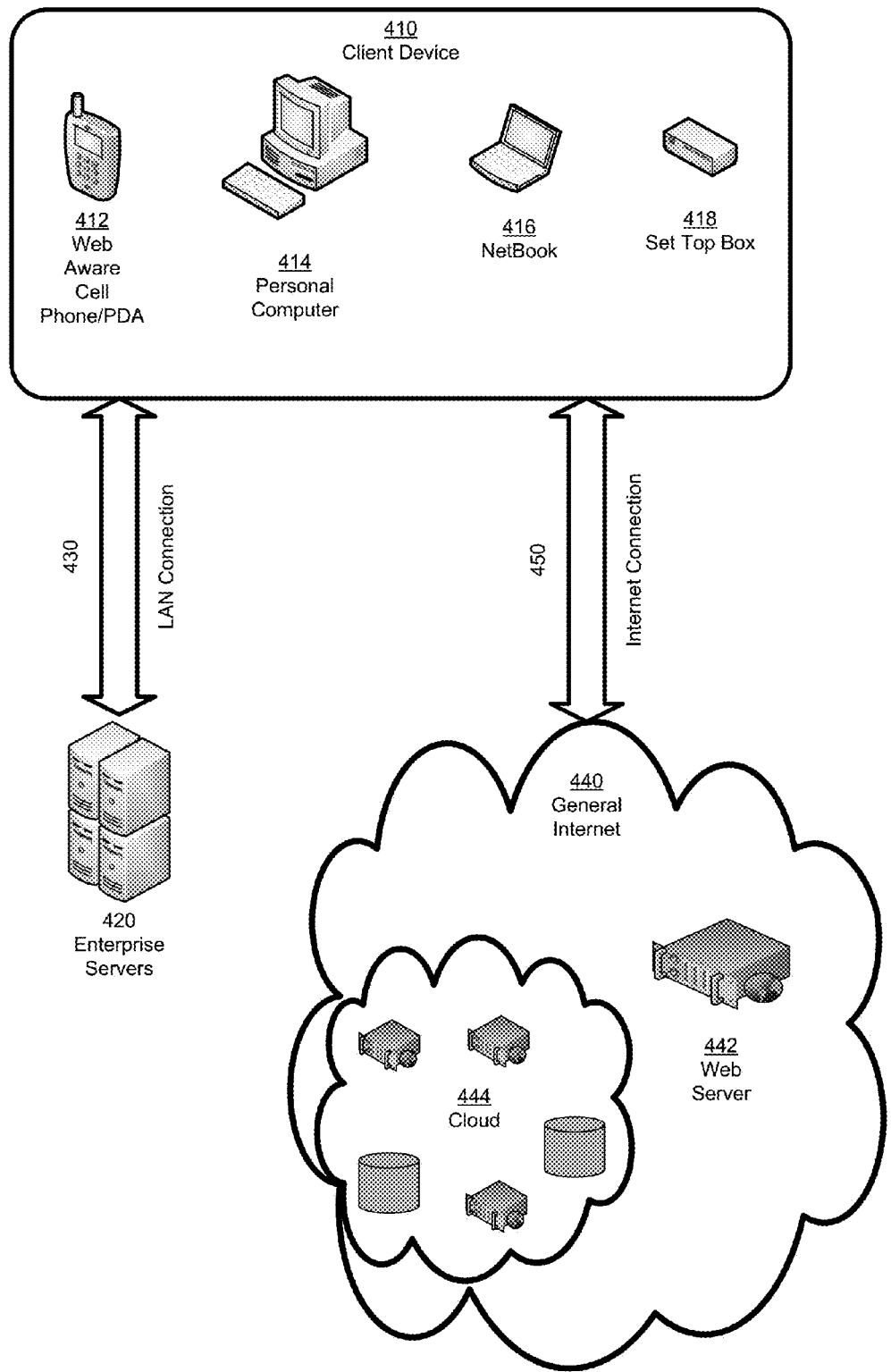
FIG. 4 illustrates an exemplary hardware environment for the data association and retrieval facility.

FIG. 4 illustrates an exemplary hardware environment 400 for the disclosed data association and retrieval facility.

The disclosed data association and retrieval facility is capable of being hosted on a wide range of client devices 410. If the client portion of the disclosed data association and retrieval facility is embodied in a web page, the client device may be any web-aware client, including but not limited to a web aware cell phone or personal device assistant (PDA) 412, personal computer (PC) 414, netbook 416, or web aware set top box (STB) 418. The client devices are not limited to those illustrated in 410, and for example may include, but are not limited to, network aware televisions, native smart phone applications, and the like. If the client portion of the disclosed data association and retrieval facility color layout UI is embodied in a windowed application, it may be hosted on a PC 414 or netbook 416. PC 414 may include any device of the standard PC architecture, or may include alternative personal computers such as the MacIntosh™ from Apple Computer™, or workstations including but not limited to UNIX workstations.

The client portion of the disclosed data association and retrieval facility on a client device 410 may then access the server portion of the disclosed data association and retrieval facility hosted on an enterprise server 420 or a server hosted on the general internet 430.

If the client device 410 is accessing an enterprise server 420 on a local area network (LAN), it may connect via any number of LAN connectivity configurations 430. At the physical layer this may include Ethernet™ or Wi-Fi™. At the network/session/transport layer this may include connectivity via the Transmission Control Protocol/Internet Protocol (TCP/IP) or other protocol. If the client device 410 is accessing the internet, it may connect via standard internet protocols 450 including TCP/IP for the network/session/transport layer and Hypertext Transfer Protocol (HTTP) at the application layer.

In the case where the client device 410 is accessing the general internet 440, typically a browser is used for access. Accordingly, if a browser such as Microsoft Internet Explorer™ that supports plug-ins, is used on client device 410, then a portion of the disclosed data association and retrieval facility might be implemented in the form a plug in. For example, annotation and commentary tools or search result caching may be implemented via plug in.

Enterprise server 420 may be based on a standard PC architecture, or alternatively on a mainframe.

If accessing the general internet 440, an independently hosted web server 442 may be accessed. A web server 442 may be a standard enterprise server based on a standard PC architecture that hosts an application server. Exemplary application server software includes Internet Information Server™ (IIS) from Microsoft Corporation™ or Apache Web Server, an open source application server. Web server 442 may access a database server also potentially on a standard PC architecture hosting a database. Exemplary databases include, Microsoft SQL Server™ and Oracle™. In this way a color layout image search engine may run on 2-tier or 3-tier platforms.

Alternatively, the server portion of the disclosed data association and retrieval facility may be hosted on a cloud computing service 444. Cloud computing service 444 contains a large number of servers and other computing assets potentially in geographically disparate locations. These computing assets may be disaggregated into their constituent CPUs, memory, long term storage, and other component computing assets. Accordingly, the server portion of the disclosed data association and retrieval facility, when hosted on cloud computing service 444, would have both centralized and distributed data storage on the cloud, accessible via a data access API such as Open Database Connectivity (ODBC) or ADO.Net™ from Microsoft Corporation™. The application portions of the disclosed data association and retrieval facility color layout image search engine could also be hosted on computing assets in the cloud computing service 444 corresponding to an application server.

Exemplary Facility Operations

Figure 5:
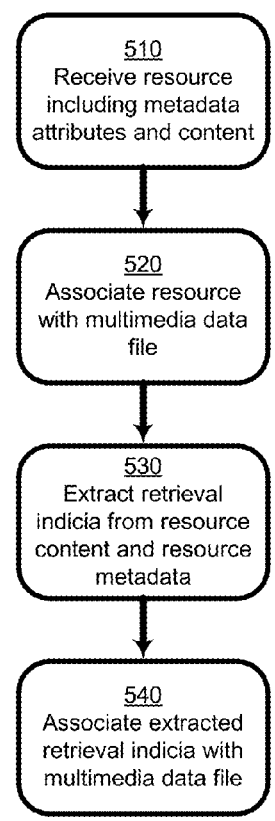
FIG. 5 is a flow chart illustrating an exemplary embodiment of indexing multi-media files in the data association and retrieval facility.
Figure 6:
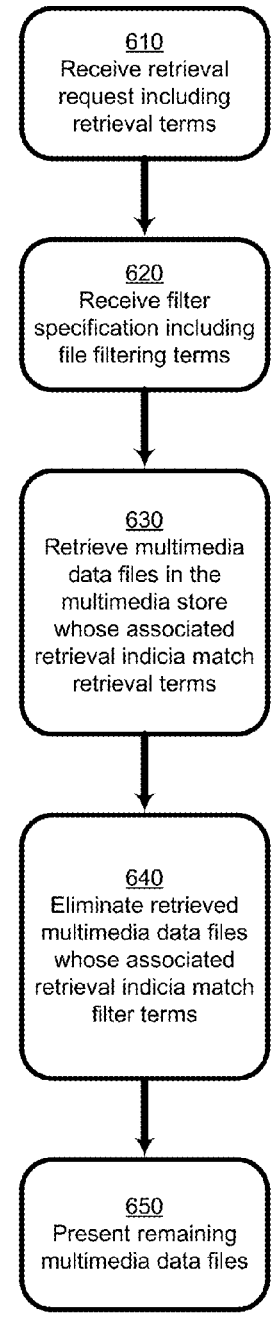
FIG. 6 is a flow chart illustrating an exemplary embodiment of retrieving and filtering multi-media files in the data association and retrieval facility.
Figure 7:
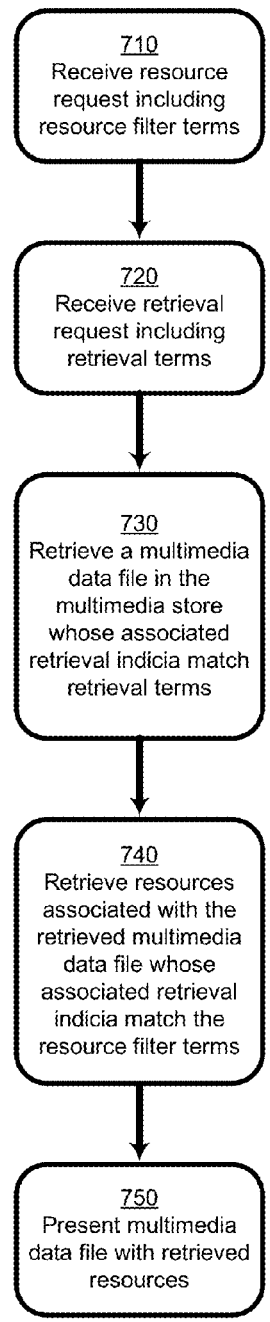
FIG. 7 is a flow chart illustrating an exemplary embodiment of retrieving data associated with multi-media files in the data association and retrieval facility.

FIGS. 5, 6 and 7 are flow charts exemplary facility operations by the disclosed data association and retrieval facility. Specifically, FIG. 5 illustrates an exemplary indexing method 500; FIG. 6 illustrates an exemplary multi-media file retrieval and filtering method 600, and FIG. 7 illustrates an exemplary associated or linked resource retrieval and filtering method 700.

In FIG. 5, and the exemplary indexing operation is performed by associating or linking resources to a file. As resource may be an attribute which is not necessarily rendered along with the associated file, or content which is rendered along with the associated file. The associated or linked resource contains data which when retrieval criteria are specified that match that data, the associated file is retrieved. The portion of the associated or linked data that is compared to retrieval criteria is called retrieval indicia.

In 510, the disclosed data association and retrieval facility has a reference to a file to be indexed. A user specifies a resource to associate with the file. The resource may be an attribute such as a metadata tag. The resource may be content such as annotations or commentary. Alternatively, the resource may be a link to another file. The received resource may alternatively be an edit to an existing attribute or content resource as well.

In 520 the received resource is associated with the file. In the case where storage 122 is an RDBMS, this may be performed by storing a reference to the resource in storage 122 and adding an entry to a table that cross references a reference to the file to the reference to the resource. In the case where an existing resource is being edited, no new table entries are necessary, and the resource itself is edited in place. Since in this embodiment, storage 122, does not store the resource itself, not changes to the storage 122 are necessary. However, if the resource is stored, then an UPDATE SQL statement may update the resource entry in storage 122.

In 530, retrieval indicia are extracted from the new or edited resource. If the associated or linked resource may be simply stored as a reference, the associated or linked resource in full is treated as retrieval indicia may be expanded and subjected to text search. Alternatively, the associated or linked resource may be scanned or parsed, specific fields and flags extracted and stored in storage 122, whereupon these fields are retrieval indicia. In the case of editing, the edited resource must be reparsed to extract the specific extracted fields and flags.

In 540, the retrieval indicia are associated with the data file. In the case where the resource is dynamically expanded, the text search for particular values in the resource constitutes the association. In the case where the data file is associated with fields and flags in the storage 122 itself, these fields in flags may be added either by a SQL UPDATE or SQL INSERT statement submitted to storage 122.

An example of storing and associating an attribute resource would be a file where a metadata tag containing the phrase "memristor" is to be associated with a video file. A table in storage 122 might contain a table of metadata tags and a cross reference table between the metatag and a list of file references. Accordingly, the disclosed data association and retrieval facility would submit SQL INSERT statements to add the metadata tag to the metadata tag table or determine if a record already existed, extract out an identifier for the record, and then enter an cross reference record for the file reference and the metatag identifier.

An example of storing and associating a content resource would be to scan commentary entered against a video file. The database would store a lookup table with a list of metadata tags of interest. The existing metadata tag table could be used for this purpose. If in scanning the text in the commentary, the word "memristor" was parsed and detected, the disclosed data association and retrieval facility would enter a record into the cross reference table to associate the metatag with the file reference.

An example of associating a content resource dynamically would be to have a table of metadata tags to text scan against commentary. When a search or filtering operation was triggered, the system would expand out the commentary dynamically, perform the text scan, and if any of the stored metadata tags, for example "memristor" was detected, it would mark the file and its associated or linked data for retrieval.

FIG. 6 describes an exemplary retrieval operation 600 where a file filtering specification comprising file filtering terms is applied to attributes of the file itself.

In 610, the disclosed data association and retrieval facility receives a file retrieval request comprising one or more retrieval terms. Typically a term is a string of characters comprising keywords or key expressions. For example a keyword might be the word "chemistry" and a key expression might be the expression "quantum mechanics" comprising the terms "quantum" and "mechanics." Additionally, Boolean operators such as AND, OR and NOT may be qualified the received retrieval term. Upon receiving the file retrieval request, the request is parsed for operators, terms and expressions, and each qualified term or qualified expression stored in a buffer. The stored qualified terms and qualified expressions constitute the search intent of the user.

In 620, the disclosed data association and retrieval facility also receives a filter specification comprising file filtering terms. The filter specification may be parsed into separate qualified terms and qualified expressions and subsequently buffered as described above. The qualified terms and qualified expressions of the filter specification constitute global terms that apply to all searches. For example, an exclusion filter set by a moderator may add these terms to a master SQL view which all public queries are executed. Another example is a SQL view where only some data access that has been paid for by the user is visible to that user.

In 630 the file retrieval is executed. In an exemplary embodiment, the filter criteria are applied to the storage 122 via a SQL UPDATE VIEW statement. Then a SQL query is dynamically generated by adding WHERE clauses to a retrieval query to be applied against the SQL view. The result is a series of file references matching the criteria. An example query might search for all files authored by "John Smith" between Jan. 1, 1990 and Jan. 1, 1991. Accordingly queries against the file attributes stored in storage 122 would include a where clause similar to as follows:

WHERE file.author_first_name="John"
and file.author_last_name="Smith"
and file.date_time_stamp>="Jan. 1, 1990"
and file.date_time_stamp<="Jan. 1, 1991".

The action in 640 is not necessary if SQL views are implemented as described above. However, in an embodiment where SQL views do not pre-emptively remove records with matching filtering terms, the resulting series of file references may be scanned in a SQL stored procedure cursor to eliminate records to be filtered. Specifically, a SQL stored procedure cursor iterates over the resulting series of file references, compares filter criteria to the current record in the cursor, and if a match is found, marks the record as not to be presented to the user.

In 650, the remaining files are presented to the user. This may be in the form of an ODBC, ADO™, or ADO.NET™ recordset. The recordset may also include references to associated or linked data. The final resulting series of file references may be presented according to any number of well-known data access technologies, whereupon a server script may dynamically generate HTML for viewing on a browser, or to some well-known third party format such as synchronized multi-media integration language (SMIL) or eXtensible markup language (XML). Alternatively, a non-browsing executable may consume the resulting recordset.

FIG. 7 describes an exemplary retrieval operation 700 where a resource request comprising retrieval terms is applied to the data associated or linked to a file, rather than to the file itself.

In 710, the disclosed data association and retrieval facility receives a resource retrieval request comprising one or more resource retrieval terms. Resource retrieval terms are similar to the file retrieval terms except that they are to be applied to resources, rather than to the files themselves. Accordingly, 710 results in a series of buffered qualified terms and qualified expressions in the same fashion as discussed with respect to the action in 610 of FIG. 6.

The retrieval operation 700 may be performed in conjunction with a retrieval operation setting criteria against file attributes. Accordingly in 720, a retrieval request comprising file retrieval terms may be received. Again, in 710 a series of qualified terms and qualified expressions is parsed and buffered in the same fashion as discussed with respect to item 610 of FIG. 6.

In 730, an operation is performed to retrieve all files referenced in storage 122 where the qualified file retrieval terms match. This operation is similar to step 630 as described with respect to FIG. 6.

In 740, an operation is performed to retrieve the associated or linked resources associated with the files retrieved in 730 whose attributes or context match the resource filter terms. This operation is may be done against stored fields and flags or against the associated or linked content itself as described above with respect to FIG. 5.

The actions in 730 and 740 need not be performed separately. If the storage 122 contains parsed values from the associated or linked resources, then 730 and 740 may be combined into a single query. Step 740 need only be separated from 730, if the associated or linked resources must be parsed independent of a SQL SELECT operation.

Regardless if the actions in 730 and 740 are performed serially or in a single step, the result is a series of files and their associated or linked resources. In 750, this resulting series may be presented to the user or calling application in the form of a recordset as described in 650 with respect to FIG. 6.

Figure 8:
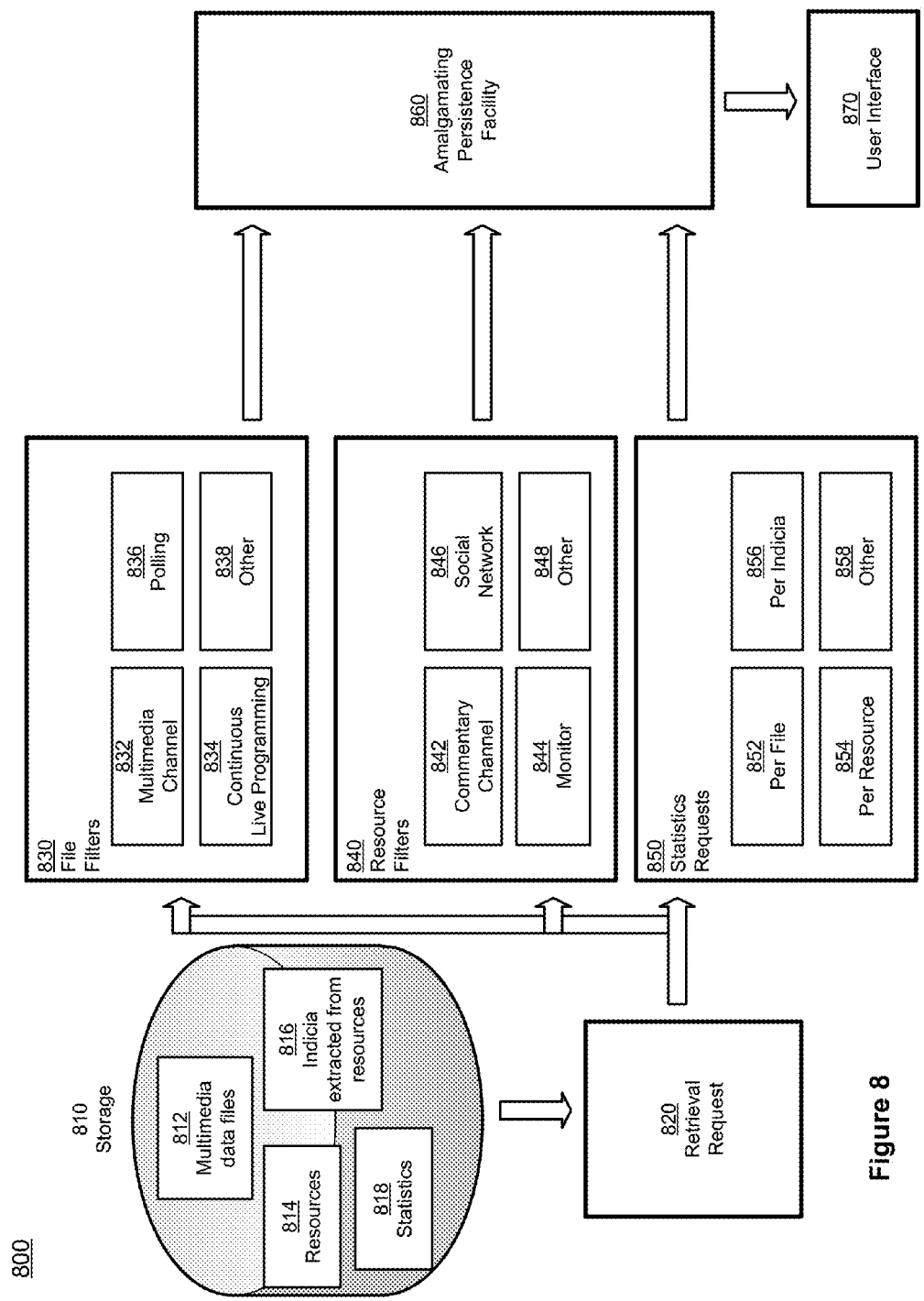
FIG. 8 is a block diagram illustrating some exemplary applications of the data association and retrieval facility.

Exemplary Multi-Media File Lifecycle to Facility Mapping

Where FIG. 1 illustrated exemplary use cases and FIGS. 2 and 3 illustrated exemplary flow of a file through the disclosed data association and retrieval facility, FIG. 8 characterizes these use cases and flows in terms of the following facilities: (1) storage 810, (2) file filters 830, (3) resource filters 840, (4) statistics requests 850, (5) an amalgamation facility and (6) a user interface 870.

Storage 810 corresponds to storage 122. It may comprise a single monolithic data store or several distributed data stores. The data stores may be a database or potentially a file directory. It may store files 812, or references to the files 812. Similarly, it may store resources 814 or references to the resources 814. The resources are stored directly whole, or may be parsed into indicia 816. While resources need not be stored directly in storage 810, indicia 816 are generally stored in storage 810. Finally, request statistics 818 may be stored in the storage 810. An example would be running counts on the most popular search terms. Such statistics would be useful in auditing the usage of the facility, or potentially in advertising.

Storage 810 may serve any combination of: (1) files, (2) resources, (3) their respective references, or (4) statistics reports. Upon receiving a retrieval request 820, the search/filter facility 128 queries storage 810. Retrieval request 820 may embody criteria from any one of a file filter 830, a resource filter 840, or a statistics request 850, File filters 830 may provide the implementation basis for a number of applications. Specifically, file filters 830 provide a feed of files meeting criteria as specified by the file filter which may operate either on the file or on associated or linked resources. Operations may be then performed on the files in support of the application. The following are some exemplary applications.

Multi-media channel 832 provides a stream of multi-media files according to a set of criteria. For example, a user may desire a stream of multi-media files of Star Trek Original Series™ episodes. Multi-media channel 832 may be implemented by receiving a file filter comprising of at least one file filtering term. The file filter may be persisted in the form of a text file which contains the filtering terms. A SQL statement to CREATE a stored procedure may be dynamically generated from the filtering terms. Alternatively the text file could contain the necessary SQL CREATE stored procedure statement. Once the stored procedure was created, it could be used multiple times. The stored procedure would contain a SQL SELECT statement with a WHERE clause containing filtering criteria per the filtering terms.

The distribution/publish facility 260 would queue and publish the retrieved episodes to via user interface 870. Specifically, the user would send a channel subscription request comprising a channel subscription request identifier, a notification point specifying a user network address, such as a TCP/IP address, to subscribe to the channel, and a file filter. Storage 810 would store the channel subscription request information and associate the file filter with the user's notification point. Later, the user would send a channel refresh request comprising the channel subscription request identifier and a date-time stamp of the last refresh performed. From the channel subscription request identifier, the multi-media channel 832 would be able to identify the user's notification point. The file filter would then retrieve all files matching the file filter criteria in the file filter associated with the channel subscription request, limited only to files posted after the date-time stamp of the last refresh performed. Accordingly, the retrieved files would be all files not yet served that match the criteria of the channel subscription request.

Continuous live programming 834 is a variation on multi-media channel 832. Here, a channel which continually plays media is subscribed to by multiple users. As the current media is rendered, the users vote on the next media file to be played. As the current media completes, the votes are tallied, the next file retrieved and rendered, and then the process repeats again. Here, votes may be implemented either as attribute, i.e. a metadata tag, or via commentary, i.e. a comment stating "I want episode 23 next." The attribute or the content should contain an identifier of the next multi-media file to be played. In the case of the comment above, the identifier is "episode 23". However, the identifier could be a word vector that could identify the episode e.g. "the one where Bob crashes his car." The file filter is able to query storage 810 for all multi-media files satisfying criteria for the channel as well as sorting on the vote counts based on attributes or resources associated in the time frame of the file last rendered.

In polling 836, the votes are for opinions on the present content rather than for opinions on content to follow. For example, in a video of a singing contest being played to multiple users, the users may vote on the best singer. They may enter commentary such as, "I like the first one" or "I like Bob best". The commentary may be parsed and processing to create a numerical ranking of the singer. After the completion of the singing contest video, the polling application 836 could run queries tallying the votes converted to numerical rankings, and subsequently display the winning singer to the users. The polling application 836 would have multiple algorithms on how to parse the content of resources, such as commentary to the video, and to assign numerical rankings and to perform statistical aggregation. One example would be to simply assign a 1 to the specified choice and 0 to the rest. Another would be to parse of key words such as "good", "great", or "best" or common words of accolade, and to create a numerical scale based on the frequency of the words, or on the number of exclamation points in the comment.

Resource filters 840 may provide the implementation basis for a number of applications. Specifically, resource filters 840 provide a feed of resources associated or linked to files that meet criteria as specified by the resource filter which may operate either on the file or on associated or linked resources. Operations may be then performed on the resources in support of the application. The following are some exemplary applications.

Commentary channel 842 is similar to multi-media channel 832 except that the feed is of commentary. For example, a number of users watching a video of the U.S. Open may want to filter commentary coming from user "Bob the Tennis Expert". As Bob entered commentary, users subscribing to the commentary channel would see Bob, and only Bob's commentary appear. The effect would be that of a live commentator except where the commentary appeared in a text commentary box in the web, or a live audio stream in an audio renderer. Commentary channel 842 may be implemented via storing a channel request for a user comprising a user notification point and a resource filter. The resource filter would have a resource term that specified "Bob the Tennis Expert." Accordingly, as the video played, whenever Bob entered a comment, the comment would be stored in storage 810 in a table, which in turn would trigger a stored procedure. The triggered stored procedure could query all commentary channel subscribers and their notification points and could then post Bob's recent comment to all of the retrieved notification points. Alternatively, the comment could be pushed via a persistent TCP/IP connection, such as over HTTP polling, thereby obviating the need for SQL.

Monitor 844 is an exclusion filter on commentary. An exclusion filter could prevent comments posted by a particularly misbehaving user from being retrieved by the users at large. For example, if "Bad Bob" had a reputation for being particular profane, a monitoring administrator might set a resource filter where all comments posted by "Bad Bob" would not be retrieved. One implementation would be to receive a resource filter specifying a WHERE clause of resource.author not equal to "Bad Bob". In an exemplary implementation, the clause would be added to a master SQL view which all file and resource requests were executed against. As a result, users would not see content where "Bad Bob" was the author, in effect excluding his commentary globally across all applications.

Social network posting 846 operates as described with respect to item 146 and item 264 in FIGS. 1 and 2 respectively. Specifically, a social network posting rule comprises a user identifier, a resource filter, and a social network identifier. The resource filter is set to identify what commentary should be posted to a particular social network. When the user specified in the social network posting rule posts a comment, the comment is stored in storage 810. The added comment triggers a stored procedure. The stored procedure queries the newly added comment plus the added resource filter. If the comment satisfies the resource filter, the social network corresponding to the social network identifier in the social network posting rule receives a post. If the user has multiple social network rules, the rules are processed sequentially in the trigger. Alternatively, an executable or client side script directly invoking an API exposed by the social network or web provider may be used, thus obviating the need for SQL.

Statistics request 850 may provide the implementation basis for a number of applications. Specifically, statistics requests 850 provide auditing data on operations on storage 810. The data may be used for auditing, research or advertising purposes. The following are some exemplary applications.

Per file statistics 852 may be collected via triggers. A table in storage 810 may contain one or more file touch counts as part of statistics 818. Whenever a file or file reference is retrieved, a trigger may run a stored procedure to increment a particular file touch count, or might store a touch record along with a date-time stamp. Alternatively, By implementing different types of retrievals in different stored procedures respectively, the stored procedures may increment different file touch counts. Upon receiving a retrieval request for statistics 820, a query may be performed on the file touch counts to perform statistic analysis. For example, the most accessed files over a time period may be calculated.

Per resource 854 and per indicia 856 touch counts may also be performed in a similar fashion. Specifically a statistic table tracking frequency and time of certain operations may be set up as part of statistics 818. Stored procedures corresponding to the operations to be tracked would increment counts in the corresponding statistical tables. Statistical analysis could be performed by querying the statistical tables.

In general, as long as there is a stored procedure that performs an action, or a trigger that may be set on a table, the event may be counted. Accordingly, statistics table 818 might potentially support frequency of access by certain users, time of access by certain users, frequency of certain types of actions and the like.

Amalgamating persistence facility 860 performs the combinations as described with respect to item 138 and item 258 in FIG. 1 and FIG. 2 respectively. Specifically, any subset of file or resource may be stored in a single multi-media file for redistribution. Specifically, a user may search or filter for a file. If the search or filter yields multiple files, the user may select a single file. Upon selection, user will query for all resources associated or linked with the selected file. The query for example would use a file identifier for the selected file as a filter. The user will then specify which resources were of interest, for example by specifying a resource identifier. The user could also potentially specify the file itself. Depending on the file identifiers and resource identifiers specified, the resources could then be copied and then stored in a single multi-media file for redistribution.

The amalgamating persistence facility 860 thus allows a user to store, distribute, and publish an aggregate or amalgam of associated resources, as a single file.

User interface 870 comprises the client side rendering components and associated tools to manipulate files being rendered. Tools may include, but are not limited to, search, filtering, rendering, annotating, and commentary tools. The user interface will vary depending on the application and is described in further detail in the following section.

User Interface

Figure 9:
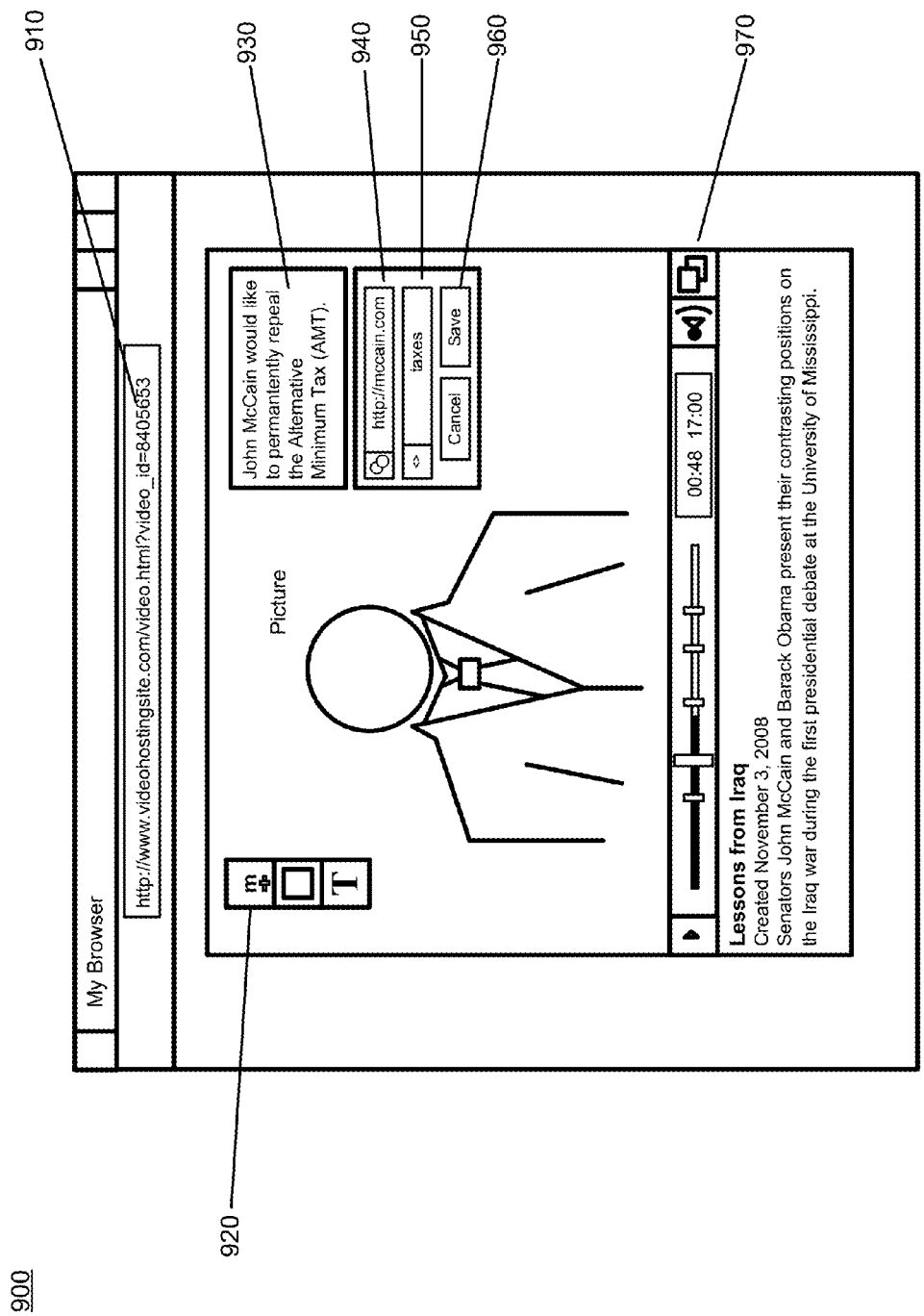
FIG. 9 illustrates an exemplary user interface of tools to associate data with a multi-media file.
Figure 10:
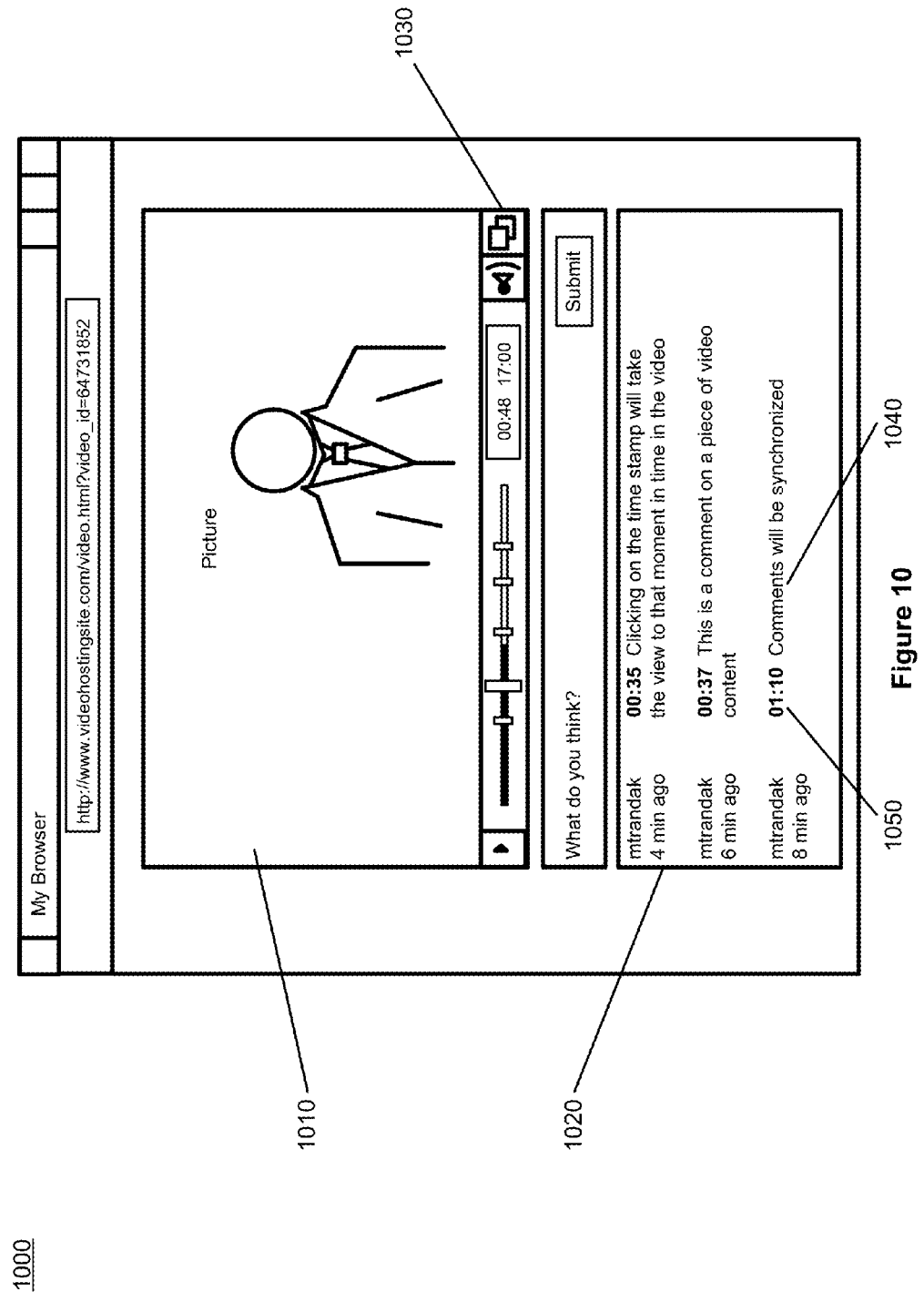
FIG. 10 illustrates an exemplary user interface for editing and viewing external synchronized commentary.
Figure 11:
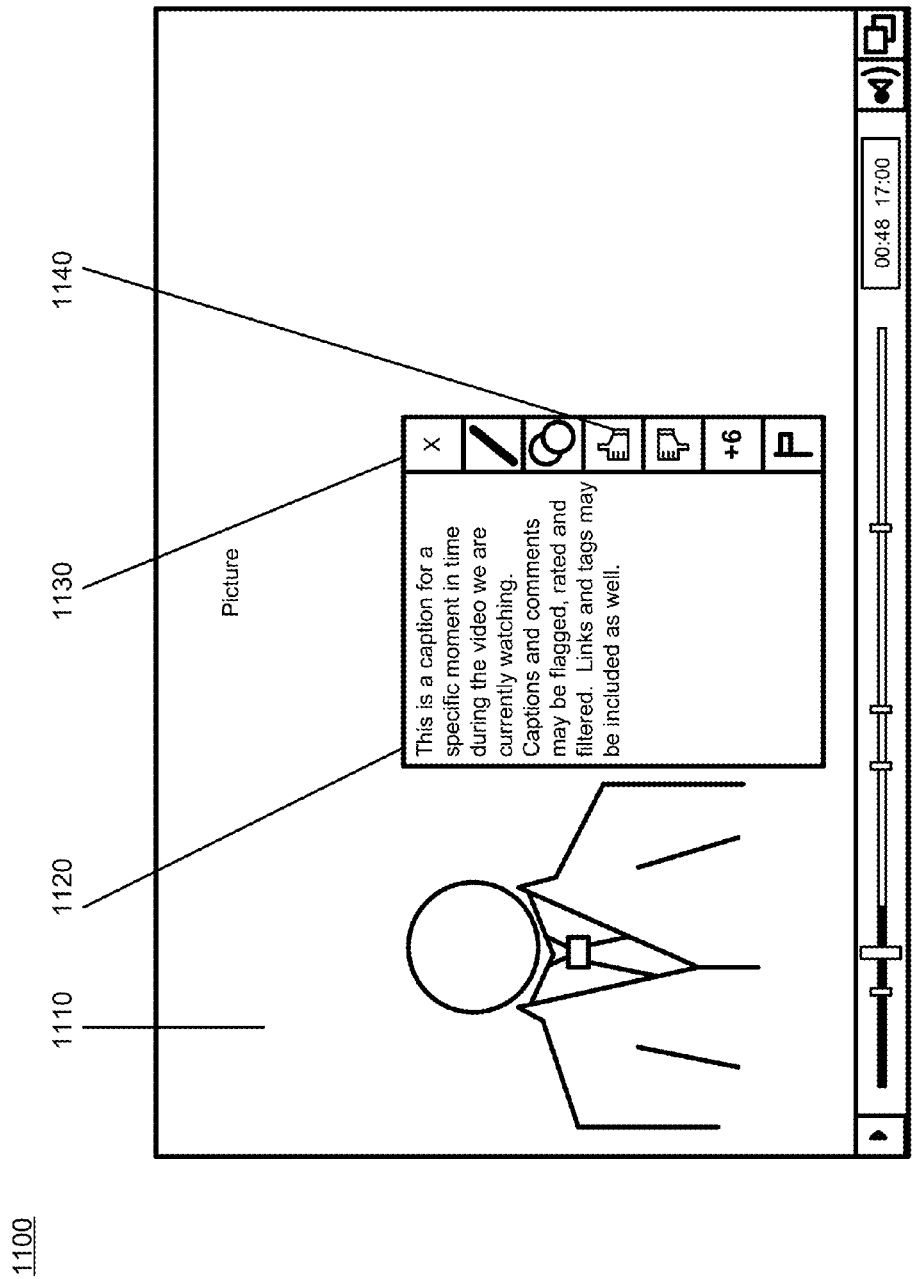
FIG. 11 illustrates an exemplary user interface for editing and viewing internal synchronized commentary.
Figure 12:
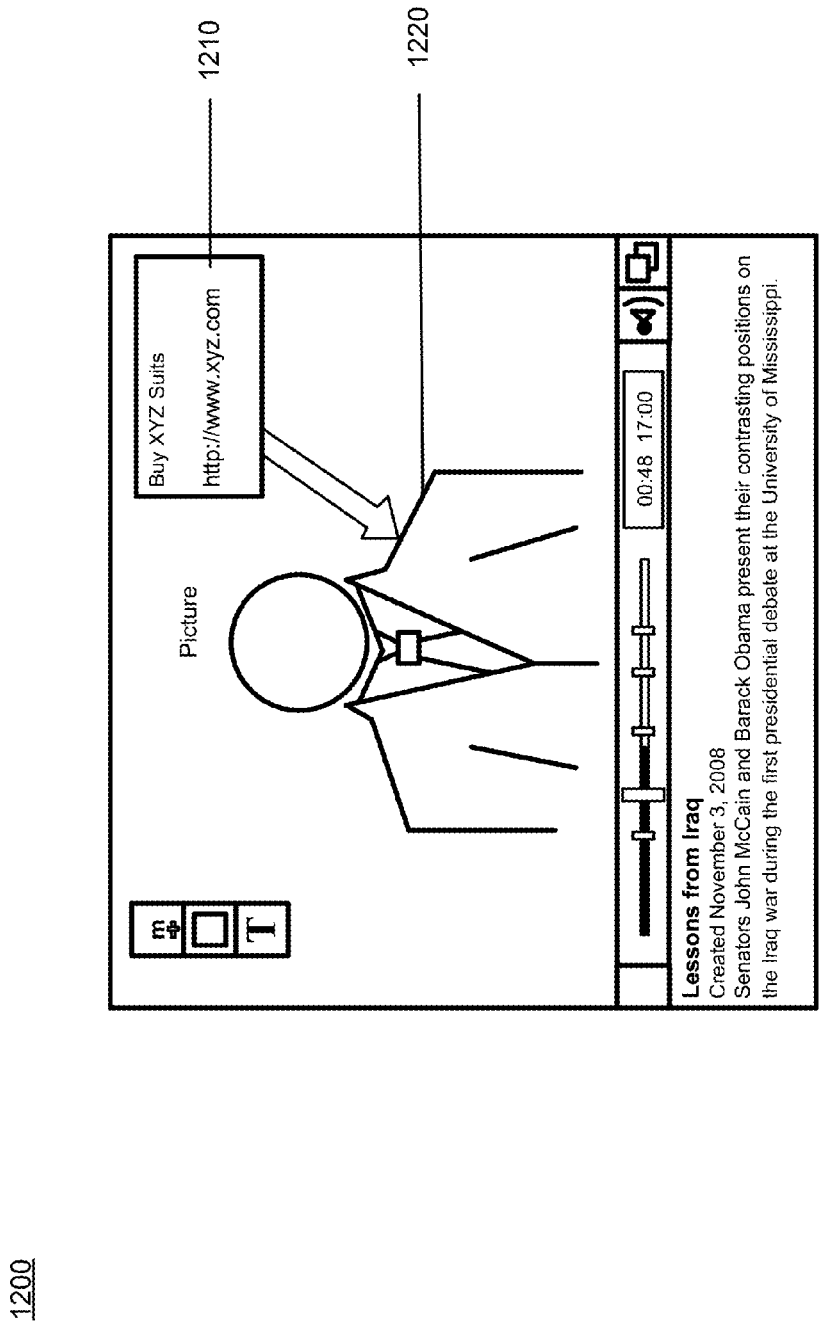
FIG. 12 illustrates an exemplary user interface for hot spots embedded in a multi-media file.
Figure 13:
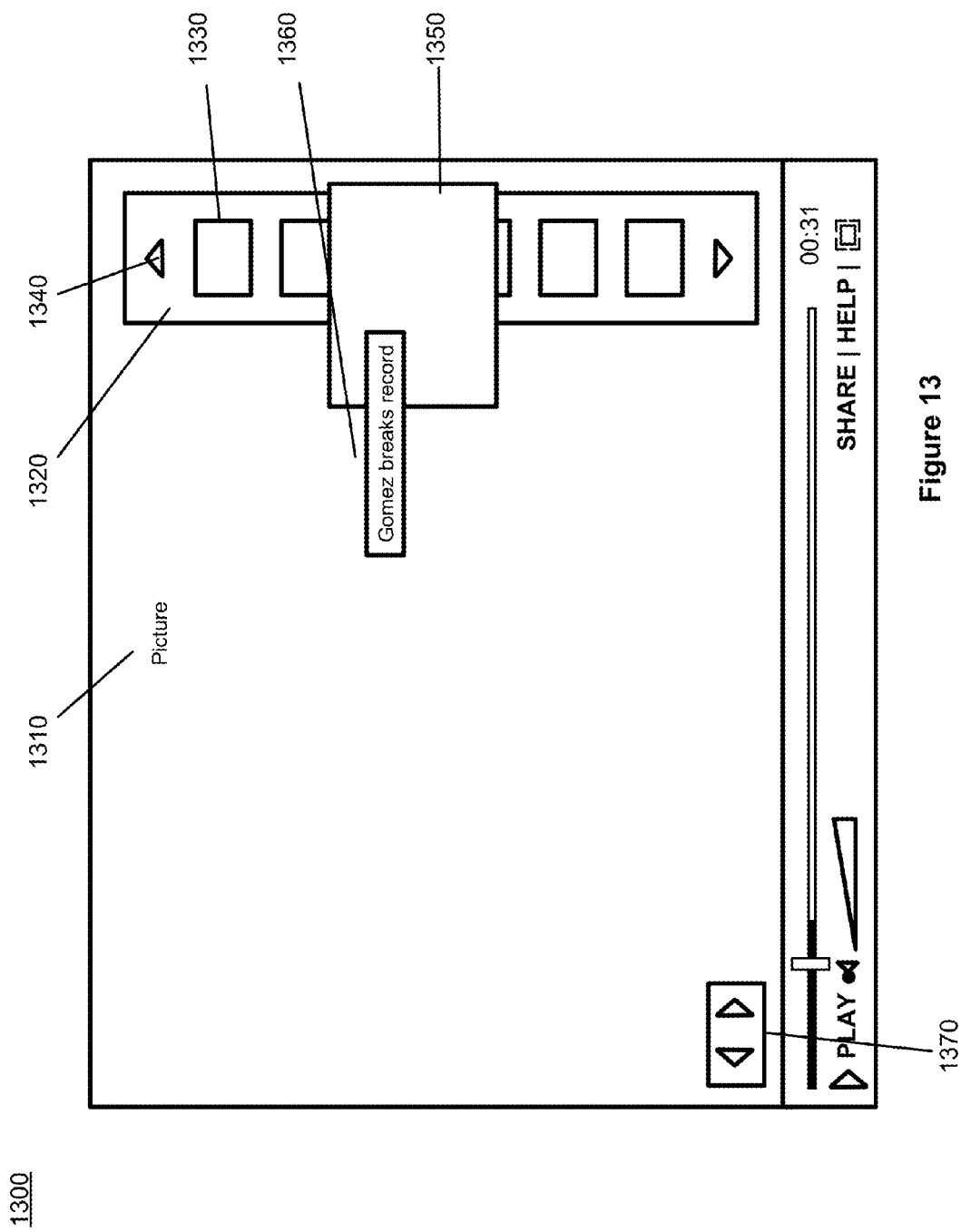
FIG. 13 illustrates an exemplary user interface for hyper-branching multi-media files.
Figure 14:
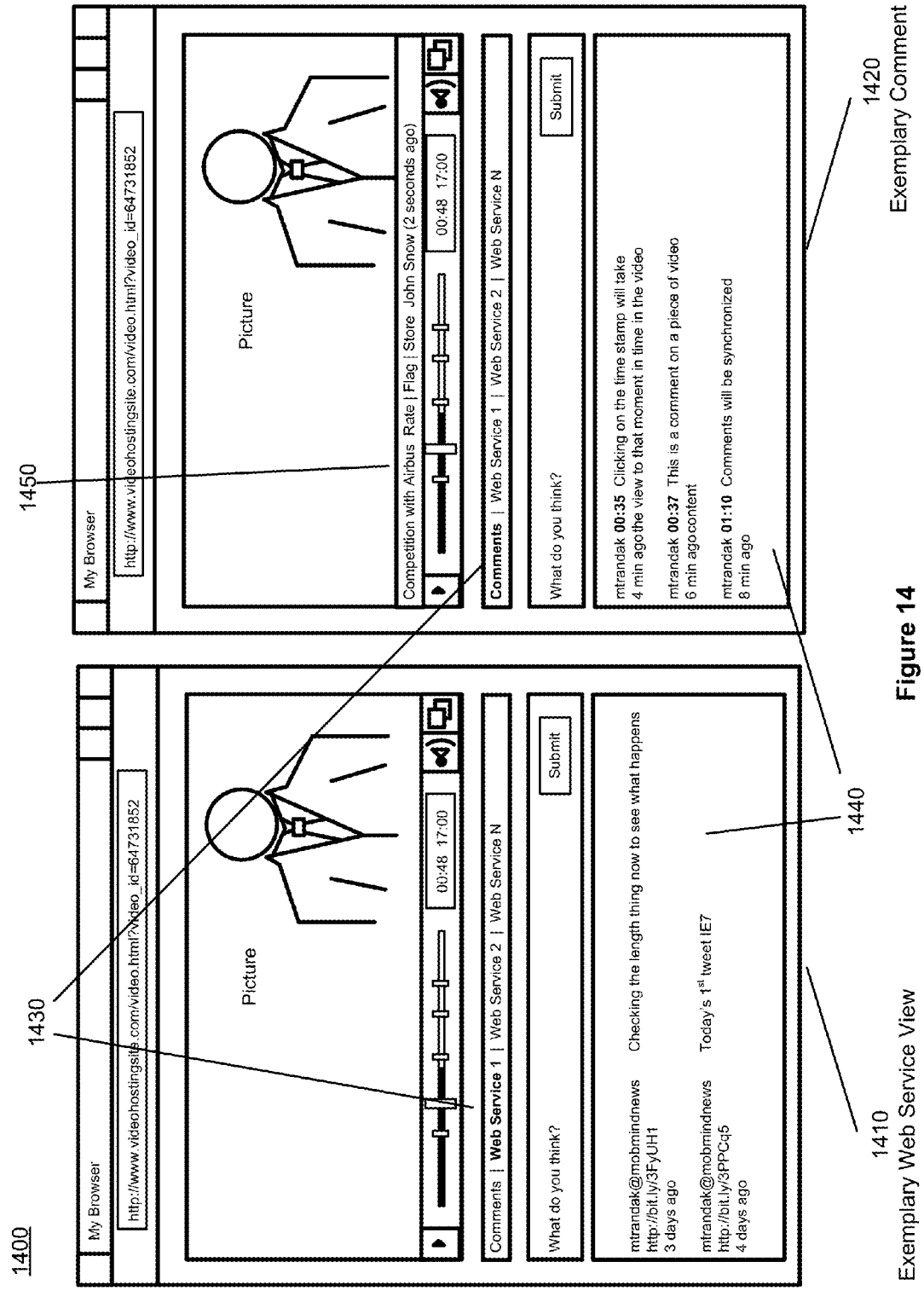
FIG. 14 illustrates exemplary user interfaces for integrated web service resources and commentary.
Figure 15:
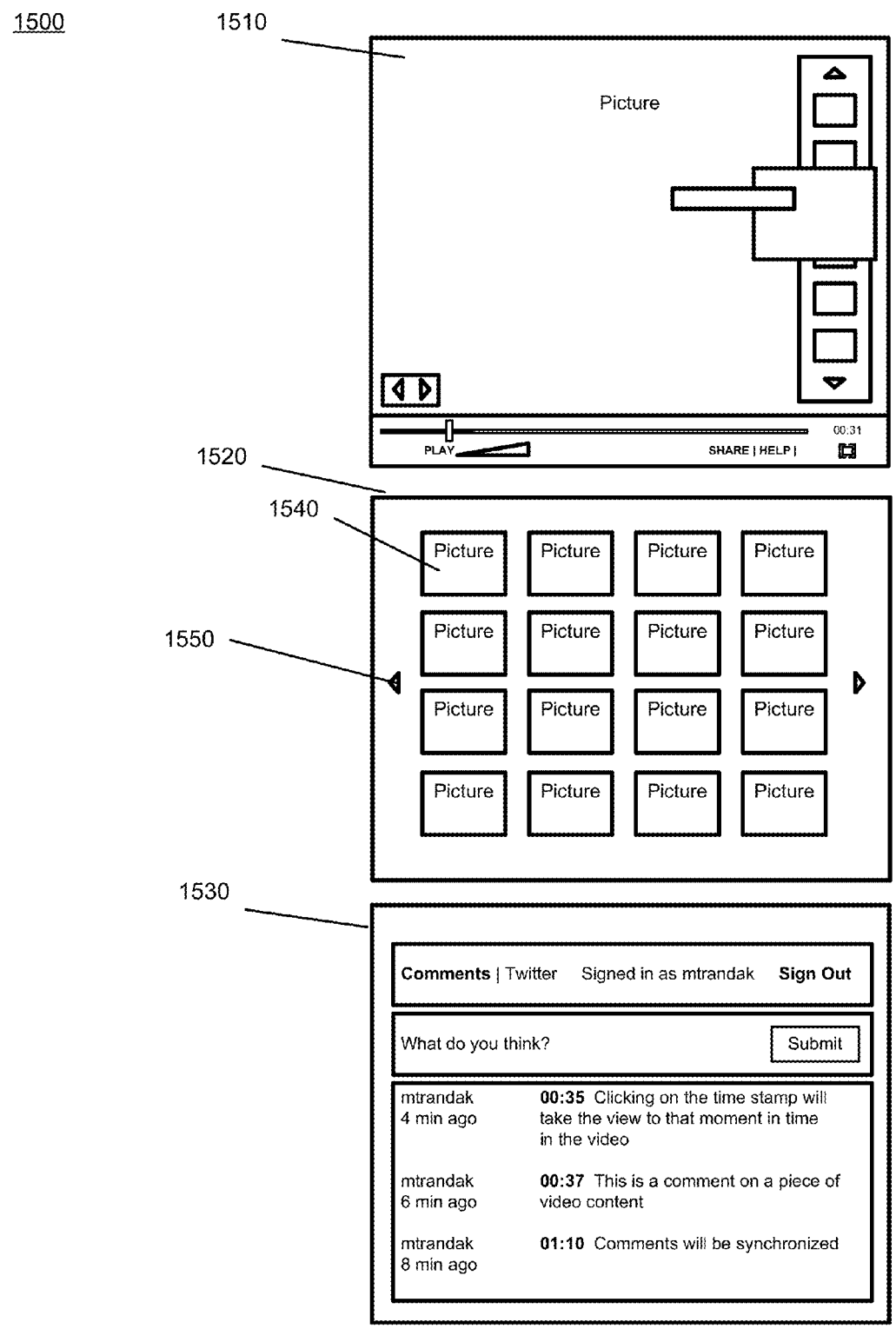
FIG. 15 illustrates an exemplary user interface for browsing and authoring.

FIGS. 9, 10, 11, 12, 13, 14, and 15 describe some exemplary embodiments. Specifically, FIG. 9 illustrates exemplary annotation tools 900, FIG. 10 illustrates an exemplary user interface for editing and viewing external synchronized commentary 1000; FIG. 11 illustrates an exemplary user interface for editing and viewing internal synchronized commentary 1100; FIG. 12 illustrates an exemplary user interface for embedded hot spots 1200; and FIG. 13 illustrates an exemplary user interface for multimedia hyper-branching 1300. FIG. 14 illustrates exemplary user interfaces 1400 for integrated web service resources 1410 and commentary 1420. FIG. 15 illustrates an exemplary user interface for browsing and authoring 1500.

FIG. 9 illustrates an exemplary user interface of tools for annotation 900. Annotation tools allow a user to select a particular location at a particular time offset from the beginning of the file, and to associate text and other data with that location and time offset. Typically, during rendering, annotations appear as text bubbles. The text bubbles may potentially contain links to web sites or other URL addressable resources.

In user interface 900, a user may access a multi-media file in a browser from a web site at a particular URL 910. As the multi-media file renders, annotation toolset 920 appears containing a bounding box tool, here represented by a square icon, and a text tool, here represented by a "T" icon. Clicking on the bounding box tool allows a user to select a particular location. Clicking on the text tool allows a user to enter text. Upon selecting the location with the bounding box tool, an editor appears over that location. Specifically, an annotation text box 930, an URL box 940, and a metadata tag text box 950 appear. In annotation text box 930, arbitrary text may be entered. In URL box 940, one or more URL links to web sites or to other URL addressable resources may be entered. In this way, an annotation may provide for links in addition to static text. In metadata tag text box 950, the user may enter keywords or other text tags to associate with the annotation. Among other applications, these metadata tags may be used as part of a resource filter. The user may save or cancel the entered annotation by clicking on buttons 960. If the save button is clicked, the annotation is committed to a data store. Otherwise, the entry is simply removed. In either option, controls 930, 940, 950, and 960 disappear. Time scroll bar 970 may be used to move the video backwards and forwards in rendering to facilitate specifying the time offset to add an annotation.

FIG. 10 illustrates an exemplary user interface for editing and viewing external synchronized commentary 1000. FIG. 11 illustrates an exemplary user interface for editing and viewing internal synchronized commentary 1100.

Synchronized commentary is where commentary is associated with a time offset from the beginning of the file. This time offset, called a synchronized timestamp, represents an insertion point of a comment into a file. When viewing comments, comments may be displayed to the viewer at the specific moment in time during the video in which the comment was authored. Synchronized commentary may be external, where the commentary is displayed outside of the rendered multi-media file, usually in a separate scroll box, and is only associated with a particular time offset with respect to the multi-media file. Internal synchronized commentary appears in the rendered multi-media file and is associated with a particular time offset and a location with respect to the multi-media file. Accordingly, internal synchronized commentary may be considered a generalized annotation.

For example, when a user chooses to author and submit a comment at the 3:42 point within the video, all subsequent viewers may see this comment at the 3:42 point within the video during video playback.

FIG. 10 provides an exemplary user interface for editing and viewing external synchronized commentary. As video 1010 is rendered, synchronized comments are to appear in comment box 1020. Time scroll bar 1030 shows the progress of the video as it renders.

When a comment's synchronized timestamp passes, the corresponding comment 1040 appears sequentially in the comment box 1020. Alternatively, comments corresponding to the synchronized are bolded or otherwise highlighted. Furthermore, the comment box 1020 may scroll through the comments such that the comments corresponding to the current synchronized timestamps are visible in the comment box 1020.

A user may also enter external synchronized commentary in comment box 1020. When the user clicks on the interior of comment box 1020, the file pause in rendering, and the user may enter a comment in the comment box 1020. The comment need not be limited to text. Valid entries include, but are not limited to, URL addressable resources, tags, pictures, audio, and other multi-media files. At the end of the entry, the file resumes rendering at the point that it paused.

Optionally, the time of the synchronized timestamp 1050 is also displayed. Clicking on the synchronized timestamp 1050 will reset the time of the rendered video to that of the synchronized timestamp 1050. For example, if the current time on the time scroll bar is 1:10, and one clicks on a comment with a synchronized timestamp of 0:52, the video will move to time 0:52. If the time of the synchronized timestamp 1050 is present, entering a comment in comment box 1020 will automatically display the timestamp of the file when the comment was entered.

FIG. 11 illustrates an exemplary user interface to edit internal synchronized commentary.

As video 1110 renders, a toolset comprising a text box 1120 and a toolbar 1130 may be activated to allow for the entering of commentary. The text box 1120 and the toolbar 1130 may be activated by clicking on the file being rendered at the location the internal synchronized content is to be entered. At that point, rendering the file is paused. Text box 1120 is used to enter text such as captions and commentary. Toolbar 1130 comprise several icons 1140 to allow for the editing and modification of the commentary. Clicking on the "x" icon closes the text box 1120 and toolbar 1130. The pencil icon represents the ability to enter text. The interlocking rings icon represents the ability to enter a URL or a link to a URL addressable resource. Comments may be rated and filtered based on the "thumbs-up" and "thumbs-down" icons. Specifically, the comment rating, here in this video shown as "+6", may be increased or decreased by clicking on the "thumbs-up" and "thumbs-down" icons respectively. Clicking on the flag icon enables a user to flag the comment as of particular interest. In some implementations, flagging is used specifically to indicate potentially offensive content. At the end of the entry, the file resumes rendering at the point that it paused.

As with internal synchronized commentary, external synchronized commentary is not limited to text. Rather, external synchronized commentary includes, but is not limited to, URL addressable resources, tags, pictures, audio, and other multi-media files.

Once internal synchronized commentary has been entered, the rendered the file will display the internal commentary at the times and locations specified during editing.

FIG. 12 illustrates an exemplary user interface for embedded hot spots 1200. Hot spots are areas of a video that are hyper-linked to other content. Hot spots may be used to obtain more information about items in a video, or potentially to provide advertising opportunities. For example, while watching a video, a user may become interested in a person's suit. One option would be to embed an annotation 1210 which encourages a viewer to "Buy xyz suits" along with a URL. Clicking on the URL will send the user to the "xyz suits" web site.

A less intrusive alternative to an explicit annotation is to specify a series of points in the video at a particular time offset from the beginning of the video, which if clicked, will send a user to a specified URL. For example, the pixel locations roughly corresponding to those of the suit 1220, for a range of time such as 40 seconds to 50 seconds, are associated with a URL. The URL and associations to the pixels are stored in a data store. Note that in FIG. 12, the playing clock is at 48 seconds, which is between 40 and 50 seconds. Accordingly, by clicking on any of the pixel locations roughly corresponding to the suit, will navigate the user to a relevant web site. This contrasts with the annotation 1210 embodiment described above in that no annotation intrudes on the user experience, the embedded hot spots are on the item of interest itself, and the user clicks on the link on his or her own volition rather than being prompted by an annotation.

FIG. 13 illustrates an exemplary user interface for multimedia hyper-branching 1300. Hyper-branching is the hyper-linking of files with each other. The disclosed data association and retrieval facility provides for the embedding of links, including URLs that point to other files, which in turn may have embedded links to other files. Note also that hyper-links may also reference parts of a file such as a particular time or time location in a video or an HTML anchor tag within the same HTML document. The user interface in 1300 illustrates video files being mutually hyper-linked together to implement multi-media hyper-branching.

1310 shows a multi-media file being rendered. In this case, the file is a video file.

On the margin of the screen, toolset 1320 contains a scrolling bar or multi-media file thumbnails 1330. Each thumbnail 1330 comprises a hyper-link to the video represented by the thumbnail 1330. Clicking on the thumbnail will close the multi-media file 1310 currently being rendered and begin rendering the corresponding video. At each end is an arrow 1340 that enables scrolling if the linked thumbnails cannot be accommodated by the viewable space available on the scroll bar. Hovering the mouse pointer over a thumbnail 1330 expands it to a larger preview 1350 of the hyper-linked video. Tooltip 1360 provides an optional caption to describe or title the hyper-linked video. The navigation control 1370, allows a user to move forwards and backwards in navigation. Specifically, as a user clicks on hyper-linked video, the user will create a chain of videos viewed. When the back arrow of navigation control 1370 is clicked, the video viewed previously in the chain is displayed, and may be set to return to the point of time during rendering that the video was navigated away from. If there is no previously viewed video, functionality is disabled. However, as the user moves backwards in the chain of videos viewed, there will be videos that had been viewed later in the chain. Accordingly, when the forward arrow of navigation control 1370 is clicked, the video that had been viewed next in the navigation chain will be viewed, and may be set to return to the point of time during rendering that the video was navigated away from. If there are no subsequent videos in the chain, the forward arrow functionality is disabled.

Toolset 1320 and navigation control 1370 are to appear in the same locations regardless of the media player used to render the hyper-linked files. This is important since the hyper-linked files may come from many different repositories. For example, some videos may be from YouTube™ and others from a locally stored. Different sites may have different renderers. Consider a first site renders a video with a YouTube™ viewer, which is hyper-linked to a second video on a second site which renders with an Apple QuickTime™ viewer. The hosting site first renders the first video with the YouTube™ viewer. Upon the viewer clicking on the hyper-linked second video, the user the hosting site then switches the rendering viewer to the Apple QuickTime™ viewer and renders the second video. The second viewer will be the same size and in the same location as where the first viewer previously appeared. Toolset 1320 and navigation control 1370 also appear in the same relative locations and with the same sizes within the second viewer as they did in the first viewer. In this way, the user hyper-linking experience remains consistent despite the change in viewers.

Upon clicking on a hyper-linked video, the video may start at the beginning of the file. However, in an alternative embodiment, the hyper-linked videos are synchronized. For example, synchronization times are identified within the hyper-linked videos that correspond to each other, such as when a batter steps up to the plate at a baseball game. An offset from the synchronization time is tracked by the web site. Accordingly, if a video of the batter is rendering, clicking on another video not only starts playing the hyper-linked video, it starts playing at the same offset from the synchronization time as the previous video. In this way, a user may see the event of the batter batting from different vantage points without discontinuity. One video showing the batter from the dugout, can be switched to a hyper-linked video by a viewer in the stands picking up at the same time the first video left off.

A variation of having video start times for hyper-linked videos is to have user specified or machine specified start times. For example a video with a point of interest at time 0:52 could have a user specify that time offset. When the video is accessed, the video would begin at 0:52 rather the beginning.

Synchronization times may be stored in the videos themselves as metadata. Synchronization times may be added after the video is acquired. Alternatively, if the video is acquired from a networked device, the device may poll a web service with a global time, such as keyed from a public atomic clock, and automatically stored in the media file. For non-networked devices, the date-time stamp of the time of capture with respect to the device's local clock may be used.

FIG. 14 illustrates exemplary user interfaces 1400 for integrated web service resources 1410 and commentary 1420. In one embodiment, the data association and retrieval facility provides the option of not only selectively displaying a given file's associated or linked resources according to a filter, but also affirmatively retrieving resources that a user may opt to associate or link from third-party sources. Examples of third-party sources may include, but are not limited to, social networks, such as Twitter™ and Facebook™, or searchable repositories of videos, such as YouTube™.

Service bar 1430 provides a list of potential sources of resources to filter on. For example, in exemplary web service view 1410, "Web Service 1" is selected in service bar 1430. Accordingly, the retrieval indicia of the currently rendering video is used to query "Web Service 1". At least some of retrieved results from "Web Service 1" are displayed comment scroll box 1440.

Similarly, in exemplary comment view 1420, "Comments" is selected in web service bar 1430. Accordingly, the retrieval indicia of the currently rendering video is used to query the data association and retrieval facility storage 122, for all associated or linked comments. The retrieved comments that are associated or linked to the currently rendering video is displayed in comment scroll box 1440. Resource filters may be optionally utilized to further narrow the resources retrieved prior to display in comment scroll box 1440.

As an alternative to displaying commentary in comment scroll box 1440, a ticker bar 1450 may be superimposed over the currently rendering video. As posts are made to a pre-selected web service, the posts are displayed in the scrolling ticker bar 1450. Additional information, such as author or time posted may also be displayed. In exemplary comment view 1420, the ticker bar 1450 is displaying a comment posted by "John Snow (seconds ago)".

FIG. 15 illustrates an exemplary user interface for browsing authoring 1500. The disclosed data association and retrieval facility is designed to allow any number of resources, multi-media or otherwise to be hyper-linked to a file. The resources themselves may by hyper-linked to other resources, other locations within the same resource, or backlinked back to the original file. In this way, a custom user experience that aggregates arbitrary resources, from arbitrary sources, third-party or otherwise, may be developed. Furthermore, the hyper-linking is to be done at time of consumption. Unlike present authored hyper-linked media which pre-defines hyper-linked resources before consumption, a user may dynamically add a link at the time of consumption. Thus, as a user may associate or link, a video, or a still picture, a text, or an arbitrary resource may be linked to a video, while they are watching that video.

To this end, exemplary user interface 1500 shows a hyper-branching video pane 1510, a video/still browser 1520 and a synchronized comment scroll box 1530 as integrated into the same user interface 1510. Hyper-branching video pane 1510 operates as described with respect to FIG. 13. Synchronized comment box operates as described with respect to FIG. 10 and FIG. 11, except that hyper-branching video pane 1510 replaces 1010 and 1110 is where the video is rendered and synchronized against. Internal commentary tools 1120 and 1130 also appear in hyper-branching video pane 1510.

Video/still browser 1520 allows a user to select a video or still image to hyper-link to the currently rendering video in hyper-branching video pane 1510. Video/still browser 1520 displays thumbnails of videos or still images 1540. Thumbnails 1540 may be browsed via scrolling controls 1550. Clicking on a thumbnail selects the corresponding video or image for hyper-linking to the presently rendering video. The user may drag and drop the video to hyper-branching video pane 1510 where the video or image is added to the list of hyper-linked videos. In some embodiments, the hyper-linked video may be synchronized with the playing video to enable rendering to occur against the same synchronizing time offsets as described with respect to FIG. 13. The selected thumbnail 1540 may also be dragged and dropped to the commentary scroll box 1530 and added as an external comment. If the external comment is to be synchronized, the video in hyper-branching video pane 1510 pauses, allowing additional text to be entered in the commentary scroll box 1530. Playing resumes when the editing is complete. Although the internal synchronized commentary tools 1120 and 1130 are not shown in FIG. 15, if activated, videos or images may be dragged and dropped into the commentary tool 1120. The effect is to embed a link to the video or image corresponding to the dragged and dropped thumbnail 1540 in to the internal synchronized comment.

End to End Scenarios

Figure 16:
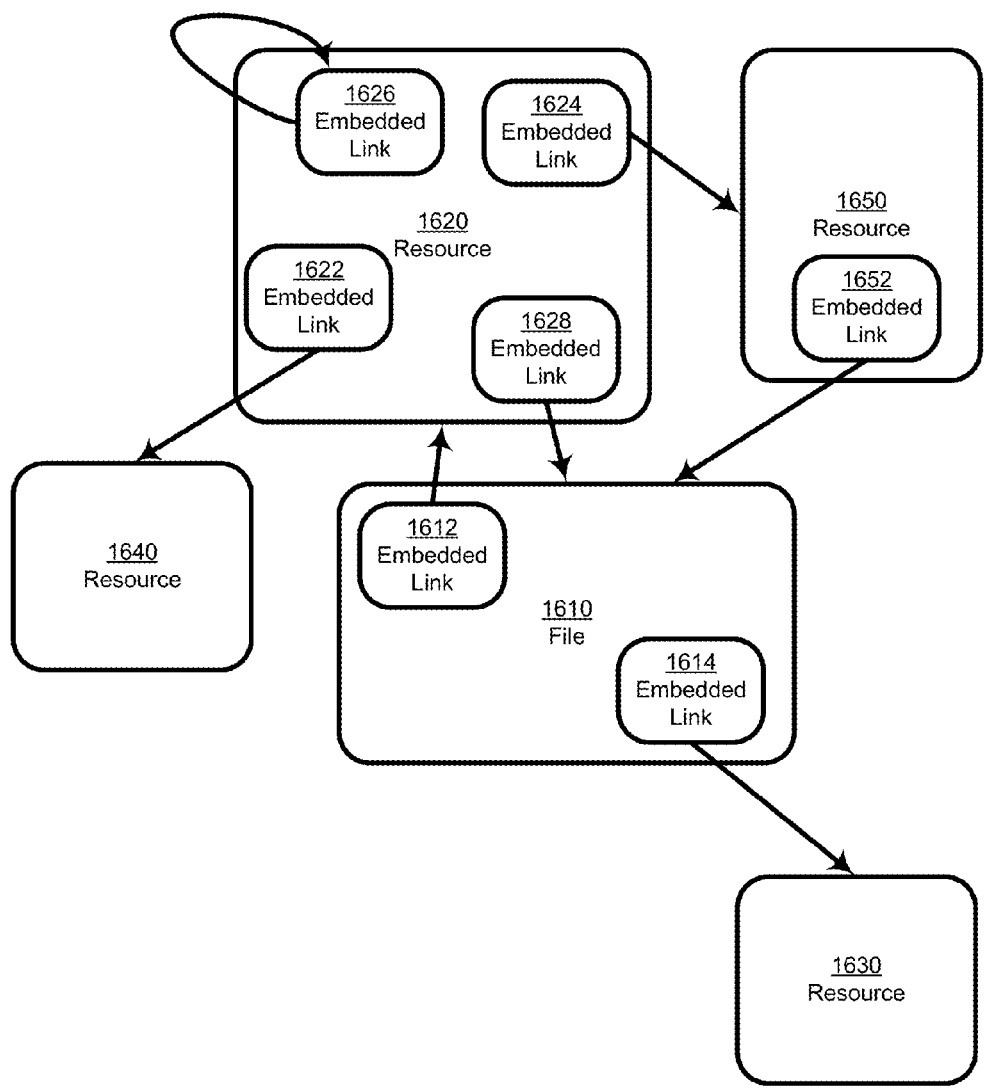
FIG. 16 is a diagram of an exemplary authoring scenario.
Figure 17:
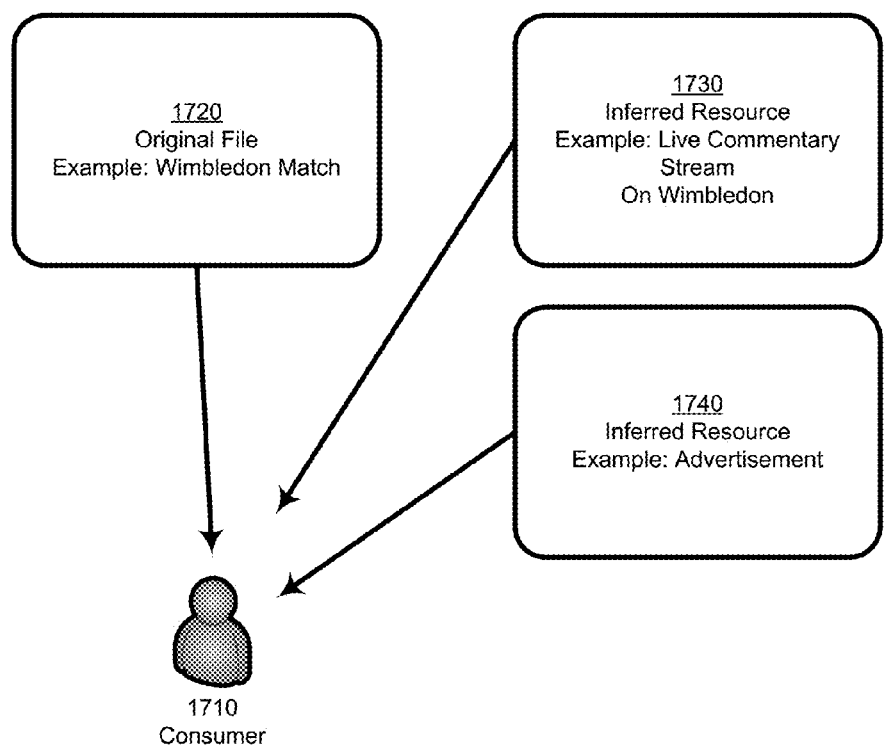
FIG. 17 is a diagram of an exemplary association by inference scenario.
Figure 18:
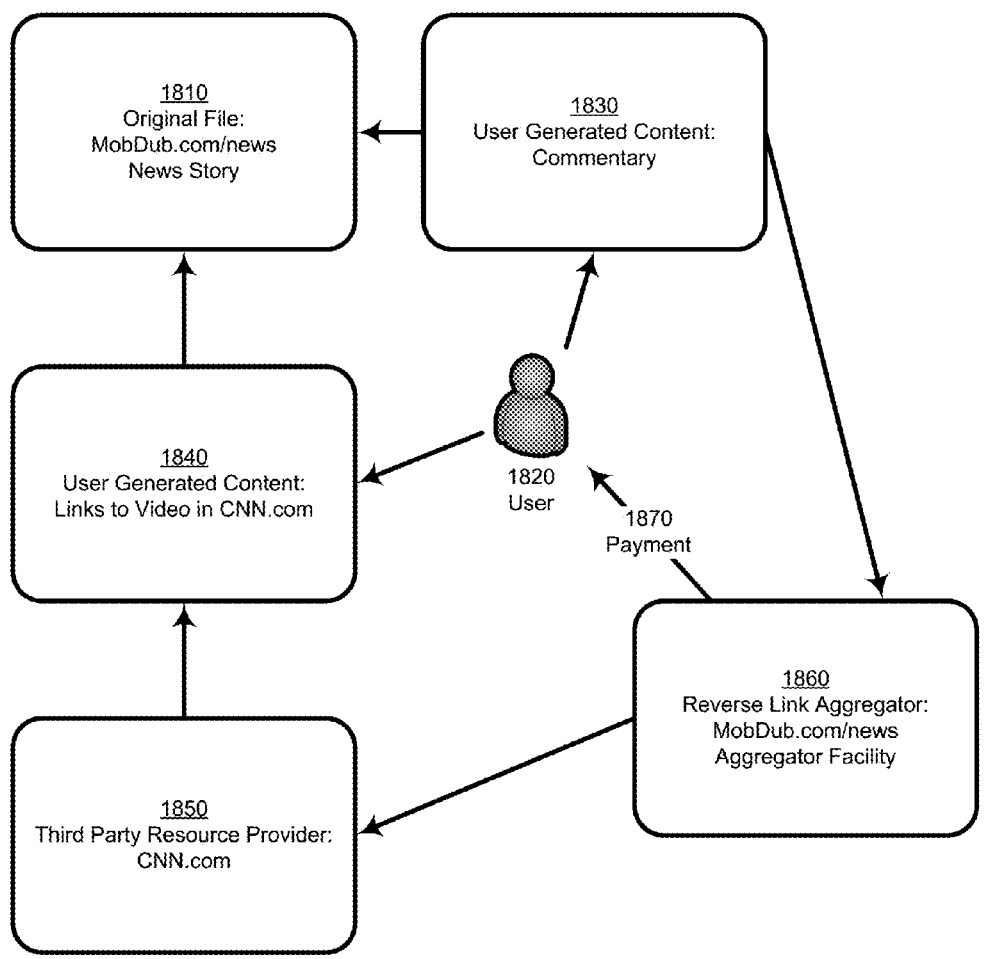
FIG. 18 is a diagram of an exemplary reverse link farming scenario.

While there are many applications of the disclosed data association and retrieval facility, the following section describes some exemplary end-to-end scenarios. FIG. 16 is a diagram of an exemplary authoring scenario 1600. FIG. 17 is a diagram of an exemplary association by inference scenario 1700. FIG. 18 is a diagram of an exemplary reverse link farming scenario 1800.

FIG. 16 is a diagram of an exemplary authoring scenario 1600. Specifically, a user consuming file 1610, may dynamically add links to other resources at the time of consumption. For example, a person watching a video of a baseball game, may pause the video, and add text commentary about the size of attendance at the game and then resume. Afterwards, the user may again pause the video and add a link to a picture of one of the players to video, and then resume. Thereafter, the user may yet again pause the video and add a link to a different video of the same game and then resume. Other users watching the same video, or thereafter accessing the video would enjoy the benefit of the links. Alternatively, the final set of links may be persisted, as a query against the data association and retrieval facility storage 122 and forwarded to other users.

Authoring scenario 16 begins with file 1610. As the user consumes the file, for example by rendering the file in a web site, the user may add link 1612 to resource 1620. Later, the user may add link 1614 to resource 1630. A resource, such as illustrated by resource 1620, may have links embedded. Or a resource, such as illustrated by resource 1630, may be empty of links. In fact, a resource need not necessarily have the capability of embedding links. Alternatively, a resource might be navigated to, and links subsequently added by the user or by other users in the same or in subsequent session.

Links may come in the form of references such as URLs or by file paths. In general, a resource may be an URL linkable object. In some circumstances, a resource may be an index to an entry in the data association and retrieval facility storage 122.

Links, such as illustrated by link 1622 to resource 1640 and link 1624 to resource 1650 may be to yet other resources. Alternatively, a link, such as illustrated by link 1626, may be a self-referential link. A self-referential link to a video or audio may point to the same file, but to a different location or time offset in the video or audio respectively. Other links, such as illustrated by link 1628 may be back-links to the original file 1610. Backlinks may simply link back to the original file, or in the case of video, may link to a different location or time offset in the video or audio respectively.

Because of backlinking, cycles in the link graph may occur. Link 1652 illustrates such an eventuality, where 1652 provides a link back to the original file 1610.

FIG. 17 is a diagram of an exemplary association by inference scenario 1700. Where a user may provide an explicit association by creating a link between a file and a resource, it is possible for the data association and retrieval facility to infer a link between a file and a resource. Such linking is called association by inference.

Consider a consumer 1710 watching a video 1720 of the Wimbledon tennis match. The video 1720 has retrieval indicia in the form of attributes and content. Some subset of this content may be used to query either the disclosed data association and retrieval facility storage 122, or third-party resource providers for content. Example third-party resource providers may include, but are not limited to, social networks, such as Twitter™ and Facebook™, or searchable repositories of videos, such as YouTube™. Some of the retrieval indicia of video 1720 may be specific to a particular time offset within video 1720.

As the consumer 1710 watches video 1720, in parallel, and potentially independent of the watching, the disclosed data association and retrieval facility queries data association and retrieval facility storage 122 and third-party resource providers for content. The content may then be streamed simultaneously to the consumer 1710, in many possible locations, including, but not limited to, in a separate pane, in the same window, in a different window, as a picture in picture window superimposed over video 1720, or on another device altogether. An example of content inferred to be associated with the Wimbledon match may be a live audio commentary stream 1730 on that very same match 1720. Commentary stream 1730 could be synchronized to align the comments of 1730 to be displayed as the corresponding events are rendered in video 1720. Other resources may be triggered by time offsets in video 1720. For example, advertisement video 1740 may be triggered when video 1720 has a portion the zooms in on a particular tennis racket. Advertisement 1740 may stream either in the same window or in a different window and terminate before the original video 1710 completes.

It is to be noted that inferred association need not be on retrieval indicia of the file 1720 being watched, but also on attributes of the consumer 1710 himself. For example, if consumer 1710 happens to be at the corner of Haight and Ashbury in San Francisco, a web aware cell phone with GPS might retrieve resources inferred to be of interest by showing a web site on the history of the location.

Inferred association need not be on attributes on the real world such as geolocation, time and place. For example, if the consumer 1710 is consuming a virtual experience, such as playing a video game, in particular a massively multiple-player role playing game (MMORPG), attributes of that experience, such as game name, location in game, event in the game, may also trigger the rendering of inferred resources.

FIG. 18 is a diagram of an exemplary reverse link farming scenario 1800. Reverse link farming is a variation on crowd-sourced news collection.

Crowdsourced news collection is the notion that content, usually relating to news, may be aggregated by specifying a submission point. A submission point may be a web page configured to receive posts of URLs, files, file references, and/or content or content references. The submission point may relate to a news topic. A submission point may be static. Specifically the submission point is a dedicated site to receive all news content submissions relating to a news topic. Alternatively, a submission point may be dynamically created. Specifically, a web site may receive a notification about a news item. A human moderator may create a submission point, or alternatively the web site may automatically generate a submission point. The address of the submission point may then be broadcast to users to solicit news content and news content references.

Users may then submit content and/or content references. References may be transmitted via SMS or via email. Alternatively, users may submit content and/or content references by entering fields in the web site submission point.

The submission point may then be accessed by a consuming user, and may be presented with an amalgamation of the recent posted submissions. Specifically, software may review submission point postings and may automatically determine the quality of submissions from various metrics including, but not limited to author history, author reputation, date-time, and submission location. Software may collate submissions for duplication. Software may then select and display submissions onto a single web page.

The amalgamated display may provide a search facility to filter results. One search possibility may be news topic. In this way, a submission point may receive submissions relating to multiple news topics, or alternatively may subdivide a news topic into subtopics. For example, a news topic relating to an oil spill may be subdivided into a subtopic about oil platform safety and a subtopic about environmental impact.

The amalgamated display may support user commentary and annotations using, for example, the facilities described in earlier sections.

Submission points and associated content may be packaged as widgets. At various points in time, and administrator, or a user may have the submission point persist all submissions including, but not limited to content references, commentary and annotations. The widget could be redistributed to other users. For example, an embeddable embodiment of a widget may store ten URL links relating to an oil spill and one URL to an annotated video, or other multi-media resource. The widget may then be sent to second user who embeds the widget in his/her browser. Upon accessing the widget, the second user may browse the URLs and the annotated video. The user may see new annotations in the video that were added by other users since the video reference was persisted in the widget. Alternatively, the widget could encapsulate viewing tools and commentary and annotation tools while viewing the persisted content. Note that an embeddable widget is but one embodiment. URLs and content references may be persisted on a server, in an XML file, to name a few alternative techniques.

Turning to the specific case of reverse linked farming, in 1800, consider the situation where a file 1810 may have users 1820 associating user generated content 1830 and links to resources 1840 that belong to a third party resource provider 1850. Reverse link farming, or reverse link aggregation is where the user generated content resources 1830 that are associated with a file 1810 are inferred to be related to the linked resources 1840 and in turn to third-party resource 1850, and accordingly are aggregated. Specifically, reverse link aggregator 1860 collects all user generated content 1830, optionally filters the user generated content on retrieval indicia on the linked resources 1840, and repackages or edits the aggregated content back to the owner of the third party resource 1850 owning the linked video. Repackaging may be done at an arbitrary level of granularity, including, but not limited to a specific link reference, a resource, a file, and the like. Proceeds of the sale may be shared with user 1820 via payment 1870.

An example is where MobNews.com, has a video of news story 1810. Some users 1820 view the story 1810 and post commentary, annotations, and other original content, multi-media or otherwise. Other users 1820 post links to related videos 1840. One of those videos 1840 is a video from third party resource provider CNN.com 1850. The aggregator facility of MobDub.com/news 1860, here shown in a box separate from 1810, queries the data association and retrieval facility storage 122, for all user generated content 1830 and links 1840 relating to the news story. Aggregator 1860 creates and executes resource filters to extract out user generated content 1830 and links 1840 that best relate to the news story. The materials are potentially edited. The final edited materials are sold back to the third party resource provider CNN.com 1850 for redistribution or publishing, again at an arbitrary level of granularity as described above. To motivate users 1820 to continue to link, aggregator 1860 may opt to provide micropayments or other payments 1870 to those users 1820.

CONCLUSION

In compliance with the statute, the subject matter of this application has been described in a language more or less specific as to structure and method features. It is to be understood, however, that the embodiments are not limited to the specific features described, since the disclosure herein comprise exemplary forms of putting the present embodiments into effect. The present embodiments are, therefore, claimed in any of its forms or modifications within the proper scope of the appended claims appropriately interpreted in accordance with the doctrine of equivalents and other applicable judicial doctrines.

What is claimed is:

1. A method comprising:
   receiving a resource request for a resource, the resource request comprising at least one resource filter term, the resource comprising metadata attributes and content to be rendered along with a multi-media data file of the one or more multi-media files stored in a data store;
   receiving a retrieval request to render the multi-media data file, the retrieval request comprising at least one retrieval term, the at least one retrieval term describing a highest ranked subject as determined from user commentaries of multiple users regarding a multi-media file that is currently being viewed by the multiple users;

retrieving the multi-media data file responsive to the retrieval request, wherein the multi-media data file is retrieved by filtering the one or more multi-media data files using one or more retrieval indicia extracted from the resource by determining whether the one or more retrieval indicia of the resource match the at least one retrieval term of the retrieval request for the multi-media data file;

retrieving the resource associated with the multi-media data file by determining whether the one or more retrieval indicia match the at least one resource filter term in the resource request;

receiving a selection of a web service of a plurality of web services that provide resources for the one or more multi-media data files; and presenting the resource along with the multi-media data file in response to a retrieval indicium of the resource indicating that a source of the resource associated with the multi-media data file is the web service selected from the plurality of web services.

2. The method of claim 1, further comprising:
receiving the resource comprising the metadata attributes and including the content to be rendered along with the multi-media data file;
associating the resource with at least one multi-media data file stored in the data store;
extracting the one or more retrieval indicia from the content and the metadata attributes;
correlating the one or more retrieval indicia to the at least one multi-media data file associated with the resource; and
presenting the content and the multi-media data file.

3. The method of claim 2, comprising storing a separate single resource, wherein metadata of the separate single resource comprises an aggregate of one or more metadata resources presented during the presentation of the multi-media data file, and wherein content of the separate single resource comprises an aggregate of one or more additional content resources presented during the presentation of the multi-media data file.

4. The method of claim 1, wherein the at least one resource filter term is an exclusion term and the resource is excluded if the one or more retrieval indicia match the exclusion term.

5. The method of claim 1, further comprising:
editing the resource associated with the multi-media data file;
extracting the one or more retrieval indicia from the content and the metadata attributes of the resource; and
associating the one or more retrieval indicia to the multi-media data file.

6. The method of claim 5, further comprising displaying a graphical user interface toolset operative to edit resources associated with the multi-media data file, while the multi-media data file is being presented.

7. The method of claim 6, wherein the graphical user interface toolset comprises a commentary text box to display a comment, the comment associated with the multi-media data file being presented and having a time specifier and commentary text, the time specifier specifying a time to render the comment during the presentation of the multi-media data file, the commentary text box to display the commentary text during the presentation of the comment.

8. The method of claim 6, wherein the graphical user interface toolset is implemented as a browser plug-in.

9. The method of claim 1, wherein the web service is a social network service or a searchable repository of videos.

10. A system comprising:
a processor to execute instructions; and
a memory to store the instructions configured to direct the processor to perform acts comprising:
extracting one or more retrieval indicia from metadata attributes and content of a resource, the resource being associated with a multi-media file of one or more multi-media files stored in a data store, the resource including user generated content for an additional multi-media data file that is linked by a user to the multi-media file;
receiving a retrieval request to render the multi-media file, the retrieval request comprising at least one retrieval term, the at least one retrieval term describing a highest ranked subject as determined from user commentaries of multiple users regarding a multi-media file that is currently being viewed by the multiple users;
retrieving the multi-media file responsive to the retrieval request, wherein the multi-media file is retrieved in response to determining that the one or more retrieval indicia of the resource match the at least one retrieval term of the retrieval request for the multi-media file;
rendering the multi-media file that is retrieved response to the retrieval request;
receiving a selection of a web service of a plurality of web services that provide resources for the one or more multi-media files stored in the data store; and
rendering the resource with the multi-media file in response to a retrieval indicium of the resource indicating a source of the resource associated with the multi-media file is the web service selected from the plurality of web services.

11. A computer-readable storage including instructions that, when executed by a processor, cause the processor to perform operations comprising:
determining retrieval indicia for a multi-media file from a resource that includes metadata attributes and content associated with the multi-media file;
querying a data store by executing a retrieval request, the retrieval request comprising at least one retrieval term, the at least one retrieval term describing a highest ranked subject as determined from user commentaries of multiple users regarding a multi-media file that is currently being viewed by the multiple users;
retrieving the multi-media file in response to determining that at least one of the retrieval indicia for the multi-media file matches the at least one retrieval term of the retrieval request;
querying a resource provider for the resource using one or more resource filtering terms;
retrieving the resource in response to at least one resource filtering term matching the at least one of the retrieval indicia of the resource;
receiving a selection of a web service of a plurality of web services that provide resources; and
rendering the metadata attributes of the resource with the multi-media file in response to a retrieval indicium of the resource indicating a source of the resource associated with the multi-media file is the web service selected from the plurality of web services.

12. The computer-readable storage of claim 11, wherein the resource provider is a web service, wherein the rendering the metadata attributes of the retrieved resource is performed in a user interface control combined with a service bar displaying a plurality of resource provider identifiers.

13. The system of claim 10, wherein the acts further comprise:
receiving the resource having the metadata attributes and the content;
associating the resource with at least one multi-media file stored in the data store;
associating the one or more retrieval indicia with the at least one multi-media file stored in the data store; and
presenting the resource and the at least one multi-media file.

14. The system of claim 13, wherein the acts further comprise storing a separate single resource, wherein metadata of the separate single resource comprises an aggregate of one or more metadata resources, content of the separate single resource comprises an aggregate of one or more content resources.

15. The system of claim 10, further comprising:
retrieving the resource using one or more resource filtering terms while the multi-media file is rendering; and
creating an association between the resource and the multi-media file that is rendering prior to the multi-media file finishes being rendered,
wherein the one or more resource filtering terms includes at least one resource filter term that is an exclusion term and an additional resource is excluded if the one or more retrieval indicia match the exclusion term.

16. The system of claim 10, wherein the acts further comprise:
editing the resource associated with the multi-media file; and
presenting the multi-media file.

17. The system of claim 16, wherein the acts further comprise displaying a graphical user interface toolset operative to edit resources associated with the multi-media file.

18. The system of claim 17, wherein the graphical user interface toolset comprises a commentary text box to display a comment, and wherein the comment has a time specifier and commentary text, the time specifier specifying a time to render the comment and the commentary text box displays the commentary text.

19. The system of claim 17, wherein the graphical user interface toolset is implemented as a browser plug-in.

20. The system of claim 10, wherein the web service is a social network service or a searchable repository of videos.

21. The computer-readable storage of claim 11, wherein the operations further comprise storing a separate single resource, wherein metadata of the separate single resource comprises an aggregate of one or more metadata resources, and wherein content of the separate single resource comprises an aggregate of one or more content resources.

22. The computer-readable storage of claim 11, wherein a resource filtering term of a plurality of resource filter terms is an exclusion term and the resource is excluded if the retrieval indicia match the exclusion term.

23. The computer-readable storage of claim 11, wherein the operations further comprise:
editing the resource associated with the multi-media file; and
presenting the multi-media file.

24. The computer-readable storage of claim 23, wherein the operations further comprise displaying a graphical user interface toolset operative to edit resources associated with the multi-media file.

25. The computer-readable storage of claim 24, wherein the graphical user interface toolset comprises a commentary text box to display a comment, the comment associated with the multi-media file, and wherein the comment has a time specifier and commentary text, the time specifier specifying a time to render the comment and the commentary text box displays the commentary text.

26. The computer-readable storage of claim 24, wherein the graphical user interface toolset is implemented as a browser plug-in.

27. The computer-readable storage of claim 11, wherein the web service is a social network service or a searchable repository of videos.

* * * * *